(12) United States Patent
Lee et al.

(10) Patent No.: US 12,302,021 B2
(45) Date of Patent: May 13, 2025

(54) IMAGE SENSOR, OPERATING METHOD OF THE SAME, AND PIXEL INCLUDING PLURALITY OF PHOTODIODES

(71) Applicant: SAMSUNG ELECTRONICS CO., LTD., Suwon-si (KR)

(72) Inventors: Sanggwon Lee, Suwon-si (KR); Hyunyong Jung, Suwon-si (KR); Myunglae Chu, Suwon-si (KR); Minwoong Seo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 213 days.

(21) Appl. No.: 18/305,909

(22) Filed: Apr. 24, 2023

(65) Prior Publication Data

US 2024/0040281 A1  Feb. 1, 2024

(30) Foreign Application Priority Data

Jul. 29, 2022  (KR) .................. 10-2022-0095006

(51) Int. Cl.

| | |
|---|---|
| *H04N 25/77* | (2023.01) |
| *H04N 25/57* | (2023.01) |
| *H04N 25/59* | (2023.01) |
| *H04N 25/703* | (2023.01) |
| *H04N 25/75* | (2023.01) |
| *H04N 25/78* | (2023.01) |
| *H10F 39/18* | (2025.01) |

(52) U.S. Cl.
CPC ............. *H04N 25/77* (2023.01); *H04N 25/78* (2023.01)

(58) Field of Classification Search
CPC ........ H04N 25/77; H04N 25/78; H04N 25/57; H04N 25/59; H04N 25/70; H04N 25/703; H04N 25/75; H10F 39/18; H10F 39/803
See application file for complete search history.

(56) References Cited

U.S. PATENT DOCUMENTS

| | | | |
|---|---|---|---|
| 9,264,639 B2 | 2/2016 | Guidash et al. | |
| 10,057,516 B2 | 8/2018 | Yeh | |
| 10,257,452 B2 | 4/2019 | Sakakibara et al. | |
| 11,095,278 B2 | 8/2021 | Tanaka et al. | |
| 11,172,157 B2 | 11/2021 | Wang | |
| 11,212,457 B2 | 12/2021 | Dai et al. | |
| 12,022,221 B2* | 6/2024 | Paik | H04N 25/77 |
| 2018/0352200 A1 | 12/2018 | Matsumoto | |

(Continued)

*Primary Examiner* — Marly S Camargo
(74) *Attorney, Agent, or Firm* — MORGAN, LEWIS & BOCKIUS LLP

(57) ABSTRACT

An image sensor includes a first pixel outputting a first pixel signal, a second pixel outputting a second pixel signal, a ramp signal generator, and a comparator. The first pixel includes first transfer transistor, a first floating diffusion node, and a first gain control transistor. The second pixel includes a second transfer transistor and a second floating diffusion node. The comparator compares the first and second pixel signals. The first pixel operates in an HCG mode to output the first pixel signal as a first HCG pixel signal in a first period and operates in an LCG mode to output the second pixel signal as a first LCG pixel signal in a second period. A reset level of the second floating diffusion node of the second pixel is provided to the comparator through the column line in an interim reset period between the first period and the second period.

20 Claims, 18 Drawing Sheets

(56) References Cited

U.S. PATENT DOCUMENTS

| | | | |
|---|---|---|---|
| 2021/0250530 A1 | 8/2021 | Paik et al. | |
| 2022/0078362 A1* | 3/2022 | Jung | H04N 25/709 |
| 2024/0107195 A1* | 3/2024 | Shim | H04N 25/79 |
| 2024/0244343 A1* | 7/2024 | Kim | H04N 25/59 |

* cited by examiner

IMAGE SENSOR, OPERATING METHOD OF THE SAME, AND PIXEL INCLUDING PLURALITY OF PHOTODIODES

CROSS-REFERENCE TO RELATED APPLICATION

This U.S. non-provisional patent application claims priority under 35 U.S.C. § 119 to Korean Patent Application No. 10-2022-0095006, filed on Jul. 29, 2022, in the Korean Intellectual Property Office, the disclosure of which is incorporated by reference in its entirety herein.

1. TECHNICAL FIELD

The inventive concept relates to an image sensor or a pixel, and more particularly, to a comparator, an image sensor including a plurality of pixels and the comparator, an operating method of the image sensor, and a pixel including a plurality of photodiodes and the comparator.

2. DISCUSSION OF RELATED ART

An image sensor may include photoelectric conversion element to capture a two-dimensional (2D) or three-dimensional (3D) image of an object. The photoelectric conversion element reacts to the intensity of light reflected from the object.

An image sensor that uses a complementary metal-oxide semiconductor (CMOS) technology may be referred to as a CMOS image sensor. A pixel of the image sensor may have two different conversion gains and accordingly an increased dynamic range when it is operated using a dual conversion gain technology. However, the reliability of the image sensor may decrease when the pixel sequentially switches between the different conversion gains.

Thus, there is a need for an image sensor capable of having different conversion gains and a method for operating the same with increased reliability without significantly increasing a size the image sensor.

SUMMARY

At least one embodiment of the inventive concept provides an image sensor including a comparator for operating in different conversion gains where an input node voltage of the comparator is maintained at an appropriate level when a pixel signal of a pixel having dual conversion gain in a single frame is read and an operating method of the image sensor.

According to an aspect of the inventive concept, there is provided an image sensor including a first pixel configured to operate in a high conversion gain (HCG) mode and a low conversion gain (LCG) mode and output a first pixel signal to a column line, the first pixel including a first transfer transistor, a first floating diffusion node, and a first gain control transistor; a second pixel configured to output a second pixel signal to the column line, the second pixel including a second transfer transistor and a second floating diffusion node; a ramp signal generator configured to generate a ramp signal having a level changing with a certain slope; and a comparator configured to compare each of the first and second pixel signals output through the column line with the ramp signal. The first pixel is further configured to operate in the HCG mode and output the first pixel signal as a first HCG pixel signal in a first period and operate in the LCG mode and output the second pixel signal as a first LCG pixel signal in a second period, and a reset level of the second floating diffusion node of the second pixel is provided to the comparator through the column line in an interim reset period between the first period and the second period.

According to an aspect of the inventive concept, there is provided an operating method of an image sensor including a plurality of pixels operating in an HCG mode and an LCG mode and at least one comparator. The operating method includes resetting a first floating diffusion node of a first pixel of the pixels; comparing, by a comparator, a first HCG pixel signal of the first pixel with a ramp signal in the HCG mode of the first pixel; resetting a second floating diffusion node of a second pixel of the pixels; setting an auto-zero level of the comparator, based on a reset level of the second floating diffusion node; and comparing, by the comparator, a first LCG pixel signal of the pixel with the ramp signal in the LCG mode of the first pixel.

According to an aspect of the inventive concept, there is provided a pixel including a first photodiode, a second photodiode, a first transfer transistor, a second transfer transistor, a first gain control transistor, a second gain control transistor, a first select transistor, a second select transistor, a first floating diffusion node, a second floating diffusion node, a reset transistor, and a comparator. The comparator is configured to compare a first photodiode signal generated based on charges accumulated in the first photodiode with a ramp signal and compare a second photodiode signal generated based on charges accumulated in the second photodiode with the ramp signal, compare a first HCG photodiode signal with the ramp signal in a first period, and compare a first LCG photodiode signal with the ramp signal in a second period. A reset level of the second floating diffusion node is provided to the comparator between the first period and the second period.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
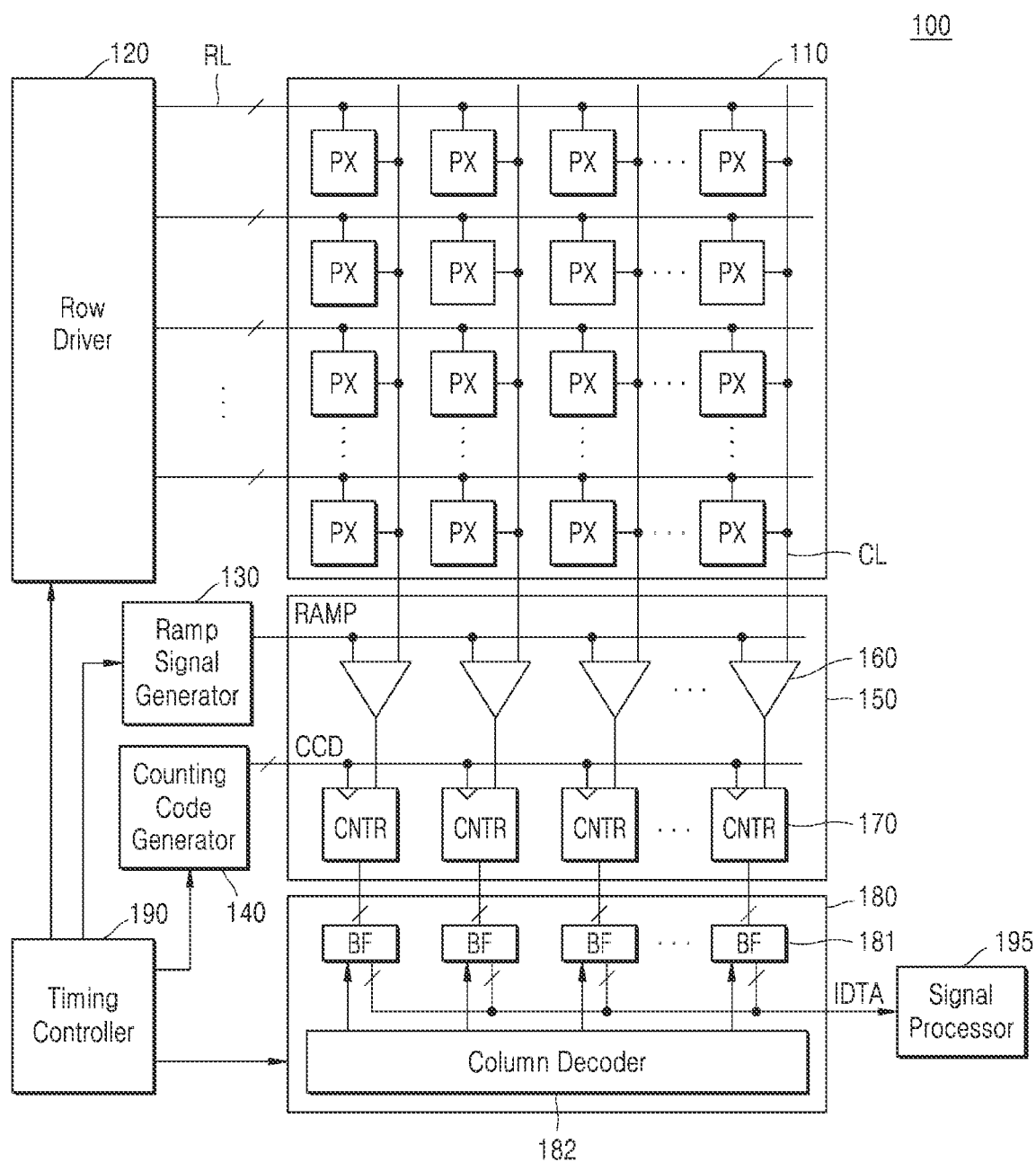
FIG. 1 is a block diagram of an image sensor according to an embodiment.

FIG. 1 is a block diagram of an image sensor according to an embodiment;

An image sensor 100 may be mounted on an electronic device, which has a function of sensing an object or light for generating an image. For example, the image sensor 100 may be mounted on an electronic device, such as a camera, a smartphone, a wearable device, an Internet of things (IoT) device, a table personal computer (PC), a personal digital assistant (PDA), a portable multimedia player (PMP), or a navigation device. The image sensor 100 may also be mounted on electronic devices that are used as components of vehicles, furniture, manufacturing facilities, doors, or various kinds of measuring equipment.

The image sensor 100 may include a pixel array 110, a row driver 120 (e.g., a driver circuit), a ramp signal generator 130, a counting code generator 140 (e.g., a logic circuit), an analog-to-digital converter (ADC) circuit 150, a data output circuit 180, and a timing controller 190 (e.g., a control circuit). The image sensor 100 may further include a signal processor 195.

The pixel array 110 may include a plurality of row lines RL, a plurality of column lines CL, and a plurality of pixels PX, which are connected to the row lines RL and the column lines CL and arranged in a matrix.

Each of the pixels PX may include at least one photoelectric conversion element and may sense light by using the photoelectric conversion element and generate an electrical signal corresponding to the sensed light. For example, the photoelectric conversion element may include a photodiode, a phototransistor, a photogate, a pinned photodiode, or the like.

Each of the pixels PX may sense light in a particular spectrum. For example, the pixels PX may include a red pixel converting light in a red spectrum into an electrical signal, a green pixel converting light in a green spectrum into an electrical signal, and a blue pixel converting light in a blue spectrum into an electrical signal. However, embodiments are not limited thereto, and the pixels PX may further include a white pixel. Alternatively, the pixels PX may include pixels of other colors such as a yellow pixel or a cyan pixel.

A color filter array transmitting light in a particular spectrum may be provided above the pixels PX. A color sensed by a pixel may be determined by a color filter provided above the pixel PX. However, embodiments are not limited thereto. A particular photoelectric conversion element may convert light in a particular wavelength band into an electrical signal according to the level of an electrical signal applied thereto.

According to an embodiment, the pixels PX of the pixel array 110 may have dual conversion gain. Dual conversion gain includes a low conversion gain and a high conversion gain. For example, each of the pixels PX may operate in low conversion gain mode or a high conversion gain mode. Here, a conversion gain is a ratio at which a charge accumulated in a floating diffusion node is converted into a voltage. Charge generated by a photoelectric conversion element of a pixel may be transferred to and accumulated in a floating diffusion node, and the charge in the floating diffusion node may be converted into a voltage according to a conversion gain of the pixel. At this time, the conversion gain may vary with the capacitance of the floating diffusion node. The conversion gain may decrease when the capacitance of the floating diffusion node increases and increase when the capacitance of the floating diffusion node decreases.

The pixels PX may operate in a low conversion gain (LCG) mode, in which the capacitance of a floating diffusion node is high, or a high conversion gain (HCG) mode, in which the capacitance of a floating diffusion node is low. Even with respect to the same charge in the floating diffusion node, the voltage of the floating diffusion node is higher in the HCG mode than in the LCG mode. The configurations of the pixels PX and the operations thereof according to a conversion gain mode are described in detail with reference to FIG. 2 below.

A dark region may be clearly seen in first image data generated when the pixels PX of the pixel array 110 operate in the HCG mode, and a bright region may be clearly seen in second image data generated when the pixels PX of the pixel array 110 operate in the LCG mode.

In an embodiment, each of the pixels PX may continuously operate in the HCG mode and the LCG mode during its corresponding readout period (or a horizontal period) in a single frame, in which the pixel array 110 receives light once (i.e., the image sensor 100 is exposed once) and the light is scanned. Accordingly, the first image data and the second image data may be generated in a single frame period. A first image based on the first image data and a second image based on the second image data may be merged into an image having a high dynamic range, in which a bright region (a high-luminance region) and a dark region (a low-luminance region) are made clear. Dual conversion gain in a single frame may be referred to as intra-scene dual conversion gain.

The row driver 120 may drive the pixel array 110 row-by-row. The row driver 120 may decode a row control signal (e.g., an address signal) generated by the timing controller 190 and select at least one of the row lines RL of the pixel array 110 in response to a decoded row control signal. For example, the row driver 120 may generate a selection control signal for selecting one of a plurality of rows. The pixel array 110 may output a pixel signal (e.g., a pixel voltage) from a row, which is selected by the selection control signal from the row driver 120. The pixel signal may include a reset signal and an image signal.

The row driver 120 may transmit, to the pixel array 110, control signals for outputting a pixel signal. Each of the pixels PX may output a pixel signal by operating in response to the control signals. In an embodiment, the row driver 120 may generate control signals for controlling each pixel PX to continuously operate in the HCG mode and the LCG mode during a readout period and provide the control signals to the pixel array 110.

The ramp signal generator 130 may generate a ramp signal RAMP (e.g., a ramp voltage), which increases or decreases with a certain slope under control by the timing controller 190. The ramp signal RAMP may be provided to each of a plurality of correlated double sampling (CDS) circuits 160 of the ADC circuit 150.

The counting code generator 140 may generate a counting code CCD under control by the timing controller 190. The counting code CCD may be provided to a plurality of counter circuits 170. In an embodiment, the counting code generator 140 may include a gray code generator. The counting code generator 140 may generate, as the counting code CCD, a plurality of code values having a resolution corresponding to a set number of bits. For example, when a 10-bit code is set, the counting code generator 140 may generate the counting code CCD including 1024 code values in ascending or descending order.

The ADC circuit 150 may include the CDS circuits 160 and the counter circuits 170. The ADC circuit 150 may convert a pixel signal (e.g., a pixel voltage) received from the pixel array 110 into a pixel value corresponding to a digital signal. A pixel signal received through each of the column lines CL may be converted by a CDS circuit 160 and a counter circuit 170 into a pixel value corresponding to a digital signal.

The CDS circuit 160 may compare a pixel signal (e.g., a pixel voltage), which is received through a column line CL, with the ramp signal RAMP and output a result of the comparison as a comparison signal. The CDS circuit 160 may output a comparison signal, which transitions from a first level (e.g., logic high) to a second level (e.g., logic low), when the level of the ramp signal RAMP is equal to the level of a pixel signal. A level transition time of the comparison signal may be determined according to the level of the pixel signal.

The CDS circuit 160 may sample a pixel signal provided from the pixel PX by using a CDS method. The CDS circuit 160 may sample a reset signal received as a pixel signal, compare the reset signal with the ramp signal RAMP, and generate a comparison signal according to the reset signal. The CDS circuit 160 may store the reset signal. Thereafter, the CDS circuit 160 may sample an image signal correlated with the reset signal, compare the image signal with the ramp signal RAMP, and generate a comparison signal according to the image signal.

In an embodiment, the CDS circuit 160 includes a comparator or a comparator circuit. For example, the comparator may include an operational transconductance amplifier (OTA) (or a differential amplifier). As described above, the image sensor 100 may support intra-scene dual conversion gain, and the comparator may receive, from the pixel PX, a pixel signal with respect to the LCG mode (hereinafter, referred to as an LCG pixel signal) and a pixel signal with respect to the HCG mode (hereinafter, referred to as an HCG pixel signal) during a readout period. At this time, the level of the LCG pixel signal may be different from the level of the HCG pixel signal.

Figure 3:
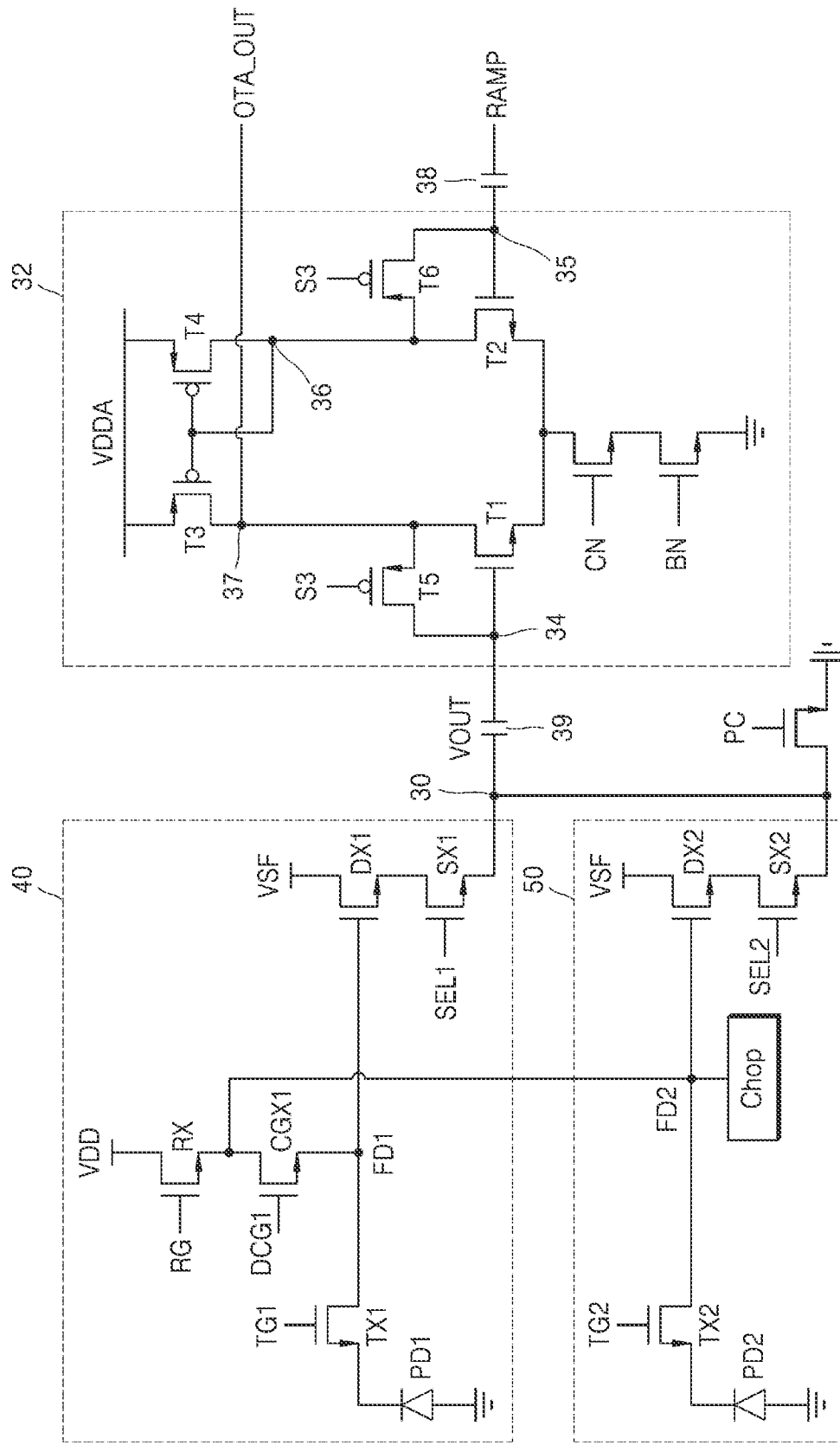
FIG. 3 is a circuit diagram illustrating a first pixel, a second pixel, and a comparator, which may be included in an image sensor, according to an embodiment.

According to an embodiment, a comparator 32 (in FIG. 3) may prevent a high voltage from being applied to an input transistor thereof by using a voltage difference between opposite terminals of a first capacitor 39 (in FIG. 3). This is described below with reference to FIG. 3.

The counter circuit 170 may count the level transition time of a comparison signal output from the CDS circuit 160 to output a count value. In an embodiment, the counter circuit 170 includes a latch circuit and an operational circuit. The latch circuit may receive the counting code CCD from the counting code generator 140 and the comparison signal from the CDS circuit 160 and latch a code value of the counting code CCD at the level transition time of the comparison signal. The latch circuit may latch a code value (e.g., a reset value) corresponding to a reset signal and a code value (e.g., an image signal value) corresponding to an image signal. The operational circuit may calculate the reset value and the image signal value and generate an image signal value having a reset level of the pixel PX removed therefrom. The counter circuit 170 may output, as a pixel value, the image signal value having the reset level removed therefrom.

It is described in the present embodiment that the image sensor 100 may include the counting code generator 140 and the counter circuit 170 includes a circuit latching a code value of the counting code CCD received from the counting code generator 140, but embodiments are not limited thereto. In an embodiment, the image sensor 100 does not include the counting code generator 140, and the counter circuit 170 includes an up counter, which sequentially increases a count value based on a counting clock signal provided from the timing controller 190, and an operational circuit or includes an up-down counter or a bitwise inversion counter.

The data output circuit 180 may temporarily store a pixel value output from the ADC circuit 150 and then output the pixel value. The data output circuit 180 may include a plurality of column memories 181 and a column decoder 182. Each of the column memories 181 may store a pixel value received from the counter circuit 170. In an embodiment, each column memory 181 may be included in the counter circuit 170. A plurality of pixel values respectively stored in the column memories 181 may be output as image data IDTA under control by the column decoder 182.

The timing controller 190 may output a control signal to each of the row driver 120, the ramp signal generator 130, the counting code generator 140, the ADC circuit 150, and the data output circuit 180 and thus control the operations or timing of the row driver 120, the ramp signal generator 130, the counting code generator 140, the ADC circuit 150, and the data output circuit 180.

The signal processor 195 may perform noise reduction, gain tuning, waveform shaping, interpolation, white balance, a gamma process, edge enhancement, binning, or the like on the image data IDTA. In an embodiment, as the pixel array 110 operates in both the HCG and LCG modes during a single frame period, the signal processor 195 may receive first image data with respect to the HCG mode and second image data with respect to the LCG mode from the data output circuit 180 and generate an image having a high dynamic range by merging the first image data with the second image data. In an embodiment, the signal processor 190 is located in a processor outside the image sensor 100.

Figure 2:
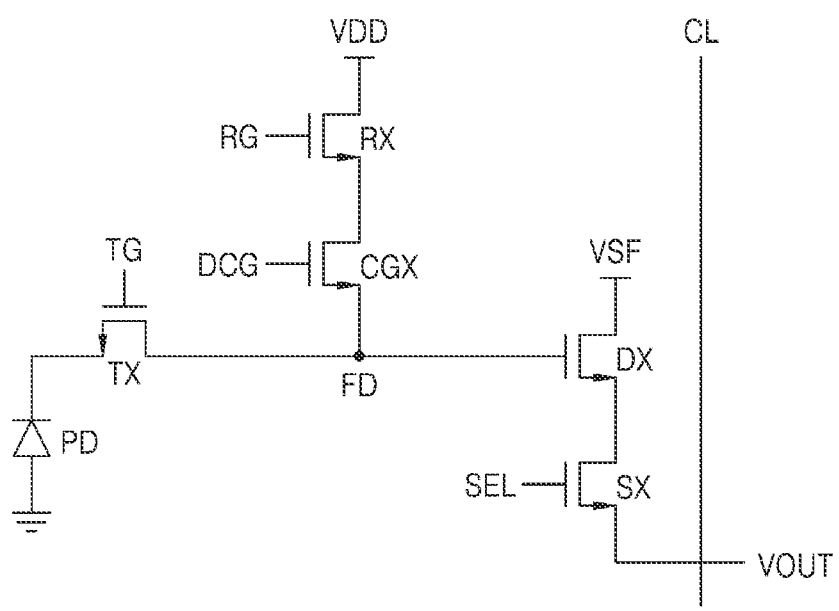
FIG. 2 is a circuit diagram illustrating an implementation of a pixel according to an embodiment.

FIG. 2 is a circuit diagram illustrating an implementation of the pixel 20 according to an embodiment. The pixel 20 may be one of the pixels PX shown in FIG. 1.

The pixel 20 may include a photodiode PD and a plurality of transistors, e.g., a transfer transistor TX, a reset transistor RX, a drive transistor DX, a select transistor SX, and a gain control transistor CGX. A drive voltage VSF is a voltage applied to one end of the drive transistor DX for a source follow operation of the drive transistor DX.

The photodiode PD may convert incident light into an electrical signal. The photodiode PD may generate charge according to the intensity of light. The amount of charges generated by the photodiode PD varies with an image capturing environment (low- or high-luminance). For example, the amount of charges generated by the photodiode PD may reach a full well capacity (FWC) of the photodiode PD in a high-luminance environment but not in a low-luminance environment.

The transfer transistor TX, the reset transistor RX, the select transistor SX, and the gain control transistor CGX may operate in response to control signals, e.g., a transfer control signal TG, a reset control signal RG, a selection control signal SEL, and a gain control signal DCG, respectively.

The reset transistor RX may be turned on in response to the reset control signal RG applied to a gate terminal thereof and reset the floating diffusion node FD based on a pixel power supply voltage VDD. At this time, the gain control transistor CGX may be turned on in response to the gain control signal DCG input to a gate terminal thereof such that the pixel power supply voltage VDD may be applied to the floating diffusion node FD, and accordingly, the floating diffusion node FD may be reset.

The transfer transistor TX may be turned on in response to the transfer control signal TG applied to a gate terminal thereof, and accordingly, charges generated by the photodiode PD may be transferred to and accumulated in the floating diffusion node FD.

The charges accumulated in the floating diffusion node FD may generate a voltage. In other words, the charges accumulated in the floating diffusion node FD may be converted into a voltage. The floating diffusion node FD may have a certain capacitance. Conversion gain may be determined according to the capacitance of the floating diffusion node FD and may be in inverse proportion to the capacitance of the floating diffusion node FD. For example, the unit of conversion gain may be uV/e. As the capacitance of the floating diffusion node FD increases, the conversion gain may decrease. As the capacitance of the floating diffusion node FD decreases, the conversion gain may increase.

The drive transistor DX may be connected to a current source connected to a column line CL. The drive transistor DX may operate as a source follower based on bias current generated by the current source and output a voltage, which corresponds to the voltage of the floating diffusion node FD, as a pixel voltage VOUT through the select transistor SX.

The select transistor SX may select the pixel 20. The select transistor SX may be turned on in response to the selection control signal SEL applied to a gate terminal thereof and output the pixel voltage VOUT (or current), which is output from the drive transistor DX, to the column line CL. The pixel voltage VOUT may be provided to the ADC circuit 150 (in FIG. 1) through the column line CL.

There may be a parasitic capacitor formed by a source/drain of the gain control transistor CGX, and the gain control transistor CGX may be turned on in response to the gain control signal DCG and connected to the parasitic capacitor. When the parasitic capacitor is connected to the gain control transistor CGX, the capacitance of the floating diffusion node FD may increase, and the pixel voltage VOUT may be higher with respect to the same amount of charges accumulated in the floating diffusion node FD, compared to the case where the gain control transistor CGX is turned off, according to a capacitance-voltage relation.

As described above, the pixel 20 may operate in either the HCG mode or the LCG mode according to the turn-on or turn-off state of the gain control transistor CGX. In the HCG mode, the conversion gain of the pixel 20 may increase, and accordingly, the gain of a circuit (e.g., the ADC circuit 150), which processes the pixel voltage VOUT output from the pixel 20, may increase. Therefore, the signal-to-noise ratio (SNR) of the image sensor 100 of FIG. 1 may increase, and accordingly, the minimum amount of detectable light may decrease. As a result, the sensitivity of the image sensor 100 to a low amount of light may increase. Because the capacitance of the floating diffusion node FD of the pixel 20 is high in the LCG mode, the FWC of the floating diffusion node FD may increase. Therefore, the sensitivity of the image sensor 100 to a high amount of light may increase.

As described above, because the pixel 20 provides dual conversion gain such that low and high amounts of light may be sensed, the dynamic range of the image sensor 100 may expand or increase. In addition, as described above with reference to FIG. 1, because the pixel 20 may continuously operate in the HCG mode and the LCG mode during a readout period, the image sensor 100, e.g., the signal processor 195 in FIG. 1, may generate an image having a high dynamic range by merging a first image with respect to the HCG mode and a second image with respect to the LCG mode.

FIG. 3 is a circuit diagram illustrating a first pixel, a second pixel, and a comparator, which may be included in an image sensor, according to an embodiment.

Referring to FIG. 3, the image sensor may include a first pixel 40, a second pixel 50, and a comparator 32.

Similar to the pixel 20 of FIG. 2, the first pixel 40 may include a first photodiode PD1 and a plurality of transistors, e.g., a first transfer transistor TX1, a reset transistor RX, a first drive transistor DX1, a first select transistor SX1, and a first gain control transistor CGX1. The drive voltage VSF is a voltage applied to one end of the drive transistor DX for a source follow operation of the drive transistor DX.

The comparator power voltage VDDA may be the same voltage as the pixel power voltage VDD. When a first bias voltage CN and a second bias voltage BN are applied, a bias current may be provided to the comparator. The first transfer transistor TX1, the reset transistor RX, the first select transistor SX1, and the first gain control transistor CGX1 may operate respectively in response to control signals, e.g., a first transfer control signal TG1, a reset control signal RG, a first select control signal SEL1, and a first gain control signal DCG1, which are provided from the row driver 120.

The first gain control transistor CGX1 may be turned on when the first gain control signal DCG1 is logic high and turned off when the first gain control signal DCG1 is logic low. For example, the first pixel 40 may operate in the LCG mode when the first gain control transistor CGX1 is turned on and operate in the HCG mode when the first gain control transistor CGX1 is turned off.

A first floating diffusion node FD1 of the first pixel 40 may be connected to the first gain control transistor CGX1, and the first gain control transistor CGX1 may be connected to the reset transistor RX. When the reset transistor RX and the first gain control transistor CGX1 are turned in response to the reset control signal RG and the first gain control signal DCG1, respectively, the first floating diffusion node FD1 may be reset to the pixel power supply voltage VDD.

When the first floating diffusion node FD1 is reset to the pixel power supply voltage VDD, the first pixel 40 may output a first reset signal to the comparator 32. When charges accumulated in the first photodiode PD1 are transferred to the first floating diffusion node FD1, the first pixel 40 may output, to the comparator 32, a first image signal based on the charges accumulated in the first floating diffusion node FD1. As described above, a pixel signal (or the pixel voltage VOUT) described herein may include an image signal and a reset signal. The first pixel 40 may output a first pixel signal, and the first pixel signal may include a first reset signal and a first image signal. When the first pixel 40 operates in the LCG mode, the first pixel signal, the first reset signal, and the first image signal may be respectively referred to as a first LCG pixel signal, a first LCG reset signal, and a first LCG image signal. When the first pixel 40 operates in the HCG mode, the first pixel signal, the first reset signal, and the first image signal may be respectively referred to as a first HCG pixel signal, a first HCG reset signal, and a first HCG image signal.

The second pixel 50 may include a second photodiode PD2 and a plurality of transistors, e.g., a second transfer transistor TX2, a second drive transistor DX2, and a second select transistor SX2. The first transfer transistor TX1, the reset transistor RX, and the second select transistor SX2 may operate respectively in response to control signals, e.g., a second transfer control signal TG2, and a second select control signal SEL1, which are provided from the row driver 120.

A second floating diffusion node FD2 of the second pixel 50 may be connected to the reset transistor RX of the first pixel 40 and may be reset to the pixel power supply voltage VDD when the reset transistor RX is turned on in response to the reset control signal RG. For example, the first pixel 40 and the second pixel 50 may share the reset transistor RX.

When the second floating diffusion node FD2 is reset to the pixel power supply voltage VDD, the second pixel 50 may output a second reset signal to the comparator 32. When the second floating diffusion node FD2 is charged with charges accumulated in the second photodiode PD2, the second pixel 50 may output, to the comparator 32, a second image signal based on the charges of the second floating diffusion node FD2. As described above, a pixel signal (or the pixel voltage VOUT) described herein may include an image signal and a reset signal. The second pixel 50 may output a second pixel signal, and the second pixel signal may include a second reset signal and a second image signal.

The comparator 32 may include an OTA. The comparator 32 may include a first input transistor T1 receiving a pixel signal and a second input transistor T2 receiving the ramp signal RAMP. The pixel signal that is direct current (DC)-blocked may be applied to a gate of the first input transistor T1 through a first capacitor 39 connected to the first input transistor T1, and the ramp signal RAMP may be applied to a gate of the second input transistor T2 through a second capacitor 38 connected to the second input transistor T2. For example, the comparator 32 may receive, as the pixel signal (the pixel voltage VOUT), the first LCG pixel signal in the LCG mode of the first pixel 40 or the first HCG pixel signal in the HCG mode of the first pixel 40. In an embodiment, the first capacitor 39 and the second capacitor 38 are located within the comparator 32.

The comparator 32 may further include a first output transistor T3 and a second output transistor T4, which may be implemented as a current mirror. However, embodiments are not limited thereto, and the structure of FIG. 3 may be changed.

The comparator 32 may further include auto-zero switches, e.g., a first switch T5 and a second switch T6, which are turned on in response to an auto-zero signal S3. The auto-zero switches, i.e., the first switch T5 and the second switch T6, may be turned on before the comparator 32 performs a comparison operation and perform an auto-zero operation by connecting a gate terminal of the first input transistor T1 to a source terminal of the first output transistor T3 and an output terminal of the second input transistor T2 to a source terminal of the second output transistor T4.

According to the auto-zero operation, the comparator 32 may be initialized, and an offset of the comparator 32 may be removed. Accordingly, the respective voltage levels of a first input node 34, a second input node 35, a comparison node 36, and an output node 37 of the comparator 32 may be the same as one another, and the same voltage level may be referred to as an auto-zero level.

An output voltage OTA_OUT (e.g., a comparison signal) may be output from the output node 37.

The first pixel 40 may be in the same column as the second pixel 50 in the pixel array 110 (in FIG. 1), and the first and second pixels 40 and 50 may share at least one comparator. The second pixel 50 may be read out after the first pixel 40 is read out, but embodiments are not limited thereto.

Figure 4:
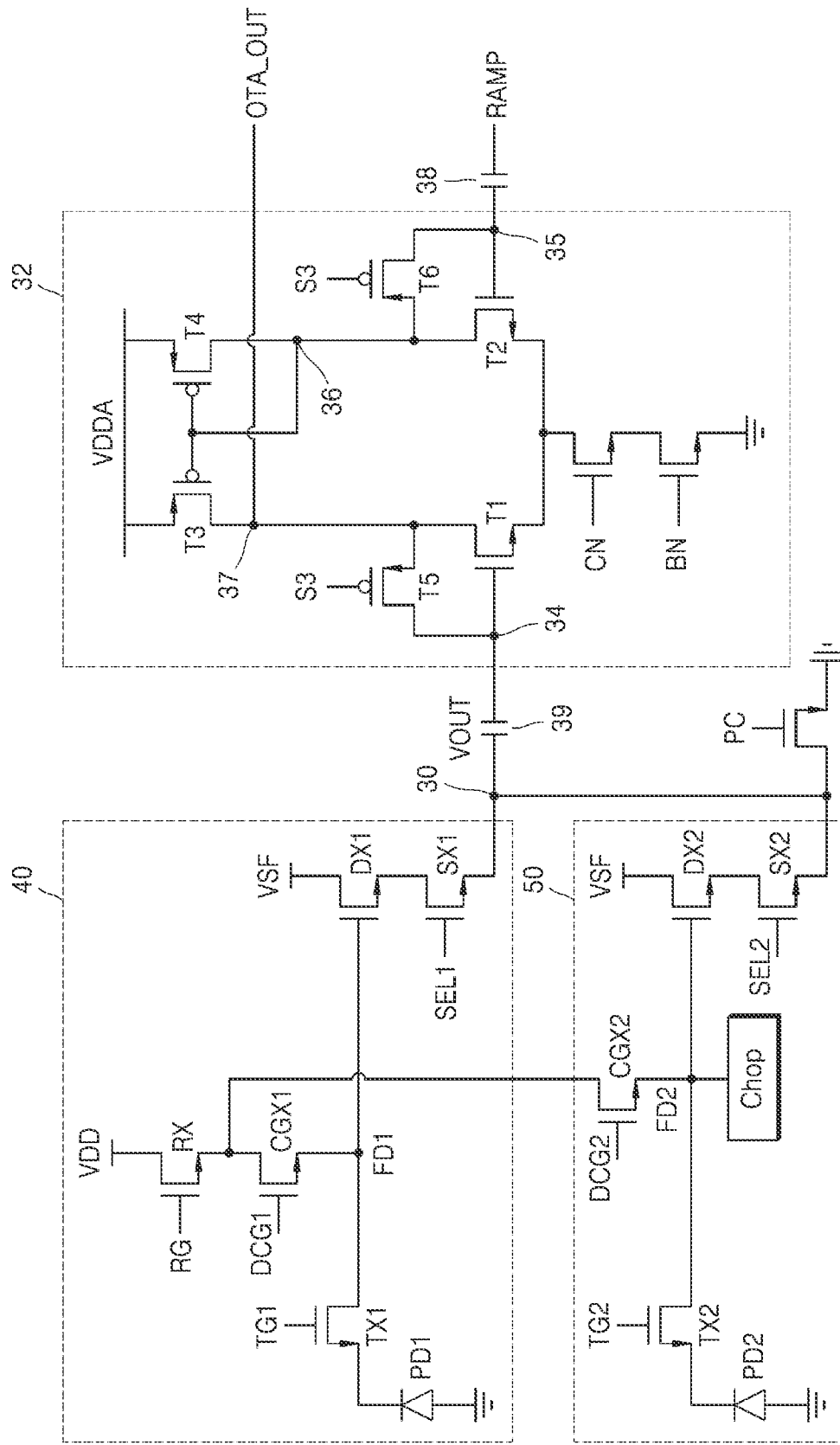
FIG. 4 is a circuit diagram illustrating a first pixel, a second pixel, and a comparator, which may be included in an image sensor, according to an embodiment.

FIG. 4 is a circuit diagram illustrating a first pixel, a second pixel, and a comparator, which may be included in an image sensor, according to an embodiment. FIG. 4 may be described with reference to FIG. 3, and redundant descriptions may be omitted. FIG. 4 may be described with reference to FIG. 3

FIG. 4 shows the second pixel 50 including a second gain control transistor CGX2. The descriptions of the first pixel 40 and the comparator 32 provided above for FIG. 3 may apply to the first pixel 40 and the comparator 32 shown in FIG. 4 and are thus omitted.

The second pixel 50 may operate in the HCG mode or the LCG mode when the second gain control transistor CGX2 is turned on or off in response to a second gain control signal DCG2. For example, when the second gain control signal DCG2 is logic high, the second gain control transistor CGX2 may be turned on, and the second pixel 50 may operate in the LCG mode. When the second gain control signal DCG2 is logic low, the second gain control transistor CGX2 may be turned off, and the second pixel 50 may operate in the HCG mode.

The second gain control transistor CGX2 and the reset transistor RX may be turned on in response to the second gain control signal DCG2 and the reset control signal RG, respectively. When the second gain control transistor CGX2 and the reset transistor RX are turned on, the second floating diffusion node FD2 may be reset to the pixel power supply voltage VDD. As described above, a pixel signal (or the pixel voltage VOUT) described herein may include an image signal and a reset signal. The second pixel 50 may output a second pixel signal, and the second pixel signal may include a second reset signal and a second image signal. When the second pixel 50 operates in the LCG mode, the second pixel signal, the second reset signal, and the second image signal may be respectively referred to as a second LCG pixel signal, a second LCG reset signal, and a second LCG image signal. When the second pixel 50 operates in the HCG mode, the second pixel signal, the second reset signal, and the second image signal may be respectively referred to as a second HCG pixel signal, a second HCG reset signal, and a second HCG image signal.

In FIGS. 3 and 4, the first pixel 40 and the second pixel 50 may be in the same column as each other, and PC denotes a signal controlling bias current.

In FIGS. 3 and 4, Chop may be a circuit connected to the second floating diffusion node FD2. For example, Chop may be a third floating diffusion node but is not limited thereto.

Figure 5:
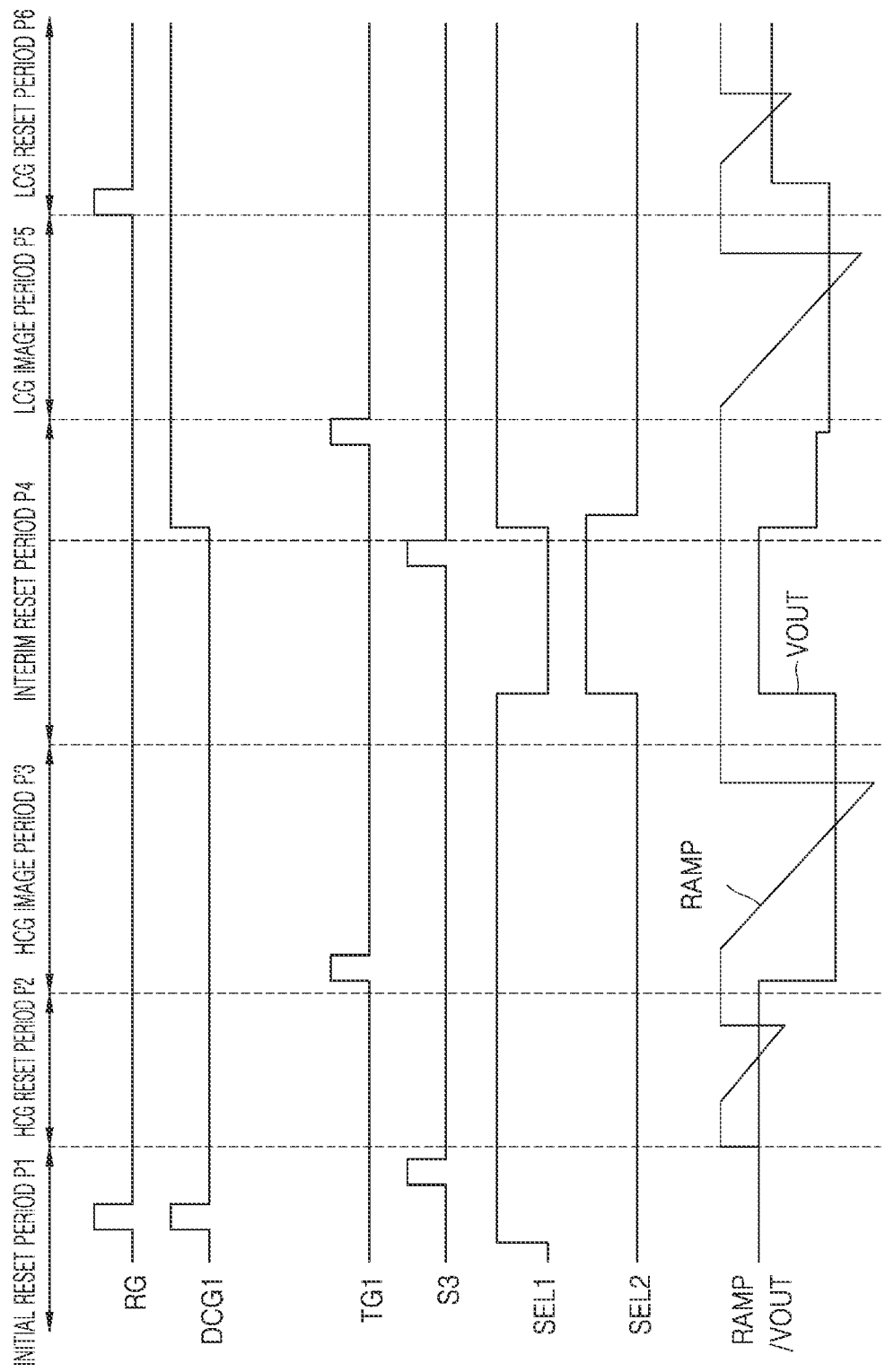
FIGS. 5 and 6 are timing diagrams illustrating the operations of an image sensor, according to an embodiment.
Figure 6:
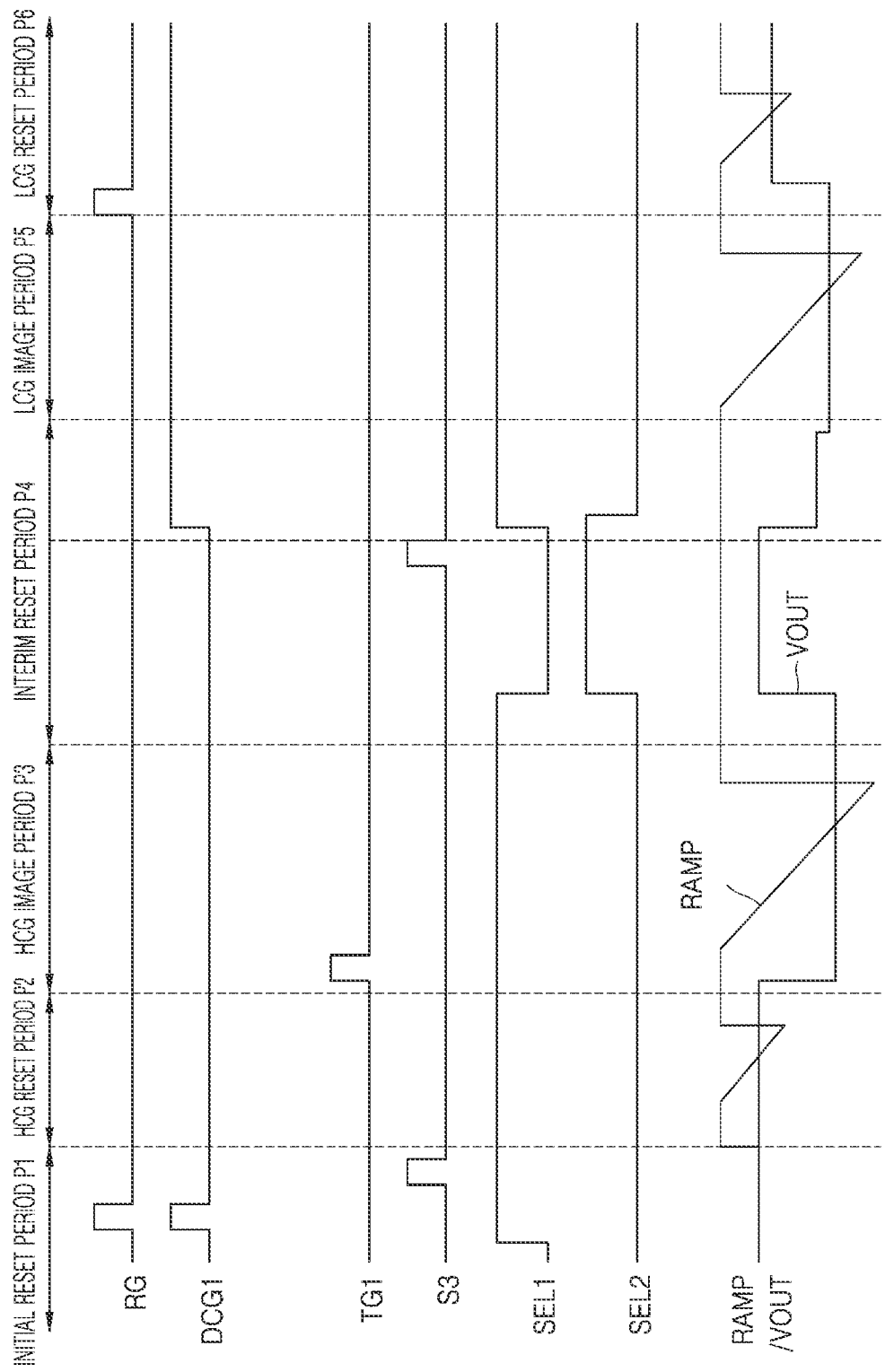

FIGS. 5 and 6 are timing diagrams illustrating the operations of an image sensor, according to an embodiment.

FIG. 5 illustrates the operations of the first pixel 40, the second pixel 50, and the comparator 32 when the first pixel 40 in FIG. 3 is read out in the HCG mode and the LCG mode. Control signals, e.g., the reset control signal RG (which may also be provided to the second pixel 50), the first gain control signal DCG1, the first transfer control signal TG1, and the first selection control signal SEL1, which are provided to the first pixel 40, and a control signal, e.g., the second selection control signal SEL2, which is provided to the second pixel 50, may be output from the row driver 120.

A control signal (e.g., the auto-zero signal S3) may be provided from the timing controller 190 to the comparator 32.

The readout of the first pixel 40 may include an initial reset period P1 in which the first floating diffusion node FD1 is reset to the pixel power supply voltage VDD, an HCG reset period P2 in which the comparator 32 compares a first HCG reset signal with the ramp signal RAMP in the HCG mode of the first pixel 40, an HCG image period P3 in which the comparator 32 compares a first HCG image signal with the ramp signal RAMP in the HCG mode of the first pixel 40, an interim reset period P4 in which an auto-zero level of the comparator 32 is set based on a reset voltage of the second floating diffusion node FD2 of the second pixel 50, an LCG image period P5 in which the comparator 32 compares a first LCG image signal with the ramp signal RAMP in the LCG mode of the first pixel 40, and an LCG reset period P6 in which the comparator 32 compares a first LCG reset signal with the ramp signal RAMP in the LCG mode of the first pixel 40.

In the initial reset period P1, the reset control signal RG, the first gain control signal DCG1, and the first selection control signal SEL1 may transition from logic low to logic high. Accordingly, the first floating diffusion node FD1 may be reset to the pixel power supply voltage VDD, and the reset voltage of the first floating diffusion node FD1 may be applied to a pixel voltage output node 30 (in FIG. 3). For example, the pixel power supply voltage VDD may be 2.5 V. Thereafter, the auto-zero signal S3 may be applied to the auto-zero switches, i.e., the first switch T5 and the second switch T6, and the auto-zero switches, i.e., the first switch T5 and the second switch T6, may be turned on. The respective voltage levels of the first input node 34, the second input node 35, the comparison node 36, and the output node 37 of the comparator 32 may be the same as one another, and the same voltage level may be referred to as an auto-zero level. For example, the drive voltage of the comparator 32 may be 1.8 V, and the auto-zero level may be 1.4 V, which is less than the drive voltage of the comparator 32.

In the HCG reset period P2, because the first gain control signal DCG1 is logic low, the first gain control transistor CGX1 may be turned off, and the first pixel 40 may operate in the HCG mode. The first floating diffusion node FD1 has been reset by the pixel power supply voltage VDD since the initial reset period P1, and the first selection control signal SEL1 has been logic high since the initial reset period P1, and accordingly, the reset voltage of the first floating diffusion node FD1 may be applied to the pixel voltage output node 30. For example, the reset voltage may be 2.5 V that is equal to the pixel power supply voltage VDD. A first HCG reset signal may be input to the comparator 32 based on the reset voltage. The comparator 32 may compare the first HCG reset signal, which is received through the first input node 34, with the ramp signal RAMP, which decreases with a certain slope, and output a comparison signal based on the first HCG reset signal.

In the HCG image period P3, because the first gain control transistor CGX1 is in a turned-off state, the first pixel 40 may be operating in the HCG mode. The first transfer control signal TG1 may transition from logic low to logic high. Accordingly, the first transfer transistor TX1 may be turned on, and charges accumulated in the first photodiode PD1 by incident light may be transferred to and accumulated in the first floating diffusion node FD1. Thereafter, the first transfer control signal TG1 may transition to logic low, and charge transfer from the first photodiode PD1 to the first floating diffusion node FD1 may be stopped. Because the voltage of the first floating diffusion node FD1 is lower than the reset voltage due to the charges accumulated in the first floating diffusion node FD1, an image voltage lower than the reset voltage of the first floating diffusion node FD1 may be applied to the pixel voltage output node 30. For example, the image voltage may be 1 V, which is lower than the reset voltage (2.5 V). A first HCG image signal may be input to the comparator 32 based on the image voltage. The comparator 32 may compare the first HCG image signal, which is received through the first input node 34, with the ramp signal RAMP, which decreases with a certain slope, and output a comparison signal based on the first HCG image signal.

The second floating diffusion node FD2 is connected to the reset transistor RX and may thus be reset to the pixel power supply voltage VDD as the reset control signal RG is activated in the initial reset period P1. For example, as the reset control signal RG is activated in the initial reset period P1, the second floating diffusion node FD2 may be reset to the pixel power supply voltage VDD together with the first floating diffusion node FD1. In the interim reset period P4, the second selection control signal SEL2 may transition from logic low to logic high, and the reset voltage of the second floating diffusion node FD2 may be applied to the pixel voltage output node 30. For example, the pixel power supply voltage VDD may be 2.5 V, and 2.5 V may be applied to the pixel voltage output node 30. Thereafter, the auto-zero signal S3 may be applied to the auto-zero switches, i.e., the first switch T5 and the second switch T6, and the auto-zero switches, i.e., the first switch T5 and the second switch T6, may be turned on. The respective voltage levels of the first input node 34, the second input node 35, the comparison node 36, and the output node 37 of the comparator 32 may be the same as one another, and the same voltage level may be referred to as an auto-zero level. For example, the auto-zero level may be 1.4 V.

After the first transfer control signal TG1 is activated and the charges accumulated in the first photodiode PD1 by incident light are transferred to the first floating diffusion node FD1 (a first transfer) in the HCG image period P3, the first photodiode PD1 may be continuously exposed to the incident light, and charges may accumulate in the first photodiode PD1 by the incident light until the first transfer control signal TG1 is newly activated in the interim reset period P4. Because the first transfer transistor TX1 is turned on in response to the first transfer control signal TG1 after the auto-zero switches, i.e., the first and second switches T5 and T6, are turned on and the auto-zero level of the comparator 32 is set in the interim reset period P4, the charges accumulated in the first photodiode PD1 may transfer to the first floating diffusion node FD1 (a second transfer).

FIG. 6 is a timing diagram illustrating a case where the first transfer control signal TG1 is not activated in the interim reset period P4. When the first transfer control signal TG1 is activated such that charges accumulated in the first photodiode PD1 transfer to the first floating diffusion node FD1 (the first transfer) in the HCG image period P3 and the first floating diffusion node FD1 saturates with the charges, the first transfer control signal TG1 is not activated in the interim reset period P4. In other words, when the first floating diffusion node FD1 saturates in the HCG mode of the first pixel 40, the first transfer transistor TX1 may be maintained in a turned off state, and there may be no more charge transfer from the first photodiode PD1. That is, unlike FIG. 5, a second transfer does not occur.

In the LCG image period P5, an image voltage based on charges accumulated in the first floating diffusion node FD1 in the LCG mode of the first pixel 40 may be applied to the pixel voltage output node 30. The image voltage applied to the pixel voltage output node 30 in the LCG mode may be higher than that applied to the pixel voltage output node 30 in the HCG mode. For example, the image voltage in the LCG mode may be 1.5 V. The comparator 32 may compare a first LCG image signal, which is received through the first input node 34, with the ramp signal RAMP, which decreases with a certain slope, and output a comparison signal based on the first LCG image signal.

In the LCG reset period P6, the reset transistor RX may be turned on in response to the reset control signal RG, the first floating diffusion node FD1 may be reset to the pixel power supply voltage VDD, and the reset voltage of the first pixel 40 in the LCG mode may be applied to the pixel voltage output node 30. The comparator 32 may compare a first LCG reset signal, which is received through the first input node 34, with the ramp signal RAMP, which decreases with a certain slope, and output a comparison signal based on the first LCG reset signal.

First image data may be generated based on the comparison signal, which is output from the comparator 32 based on the first HCG reset signal in the HCG reset period P2, and the comparison signal, which is output from the comparator 32 based on the first HCG image signal in the HCG image period P3. Second image data may be generated based on the comparison signal, which is output from the comparator 32 based on the first LCG image signal in the LCG image period P2, and the comparison signal, which is output from the comparator 32 based on the first LCG reset signal in the LCG reset period P3. The first image data may be generated when the first pixel 40 operates in the HCG mode and may clearly represent a dark region. The second image data may be generated when the first pixel 40 operates in the LCG mode and may clearly represent a bright region. The first image data and the second image data may be generated in a single frame period and merged into an image having a high dynamic range, in which a bright region (a high-luminance region) and a dark region (a low-luminance region) are made clear. Dual conversion gain in a single frame may be referred to as intra-scene dual conversion gain.

According to an embodiment, when the first pixel 40 is read out in the HCG mode and the LCG mode, a reliability issue related to the first input transistor T1 connected to the first input node 34 of the comparator 32 may be prevented from occurring due to a high voltage applied to the gate of the first input transistor T1. The reliability issue may include occurrence of leakage current in the first input transistor T1.

Figure 7A:
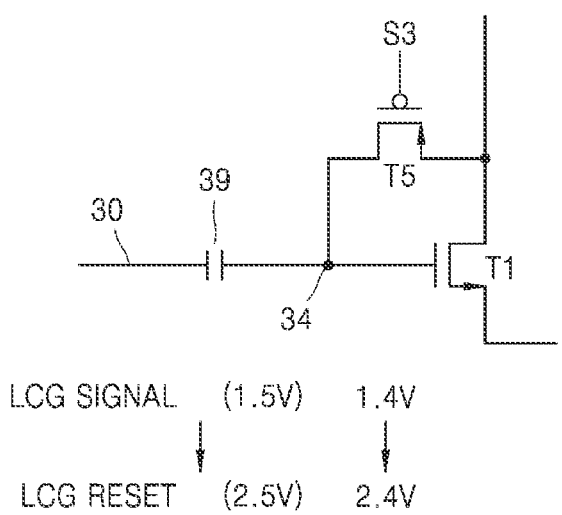
FIGS. 7A and 7B are diagrams showing voltages applied to an input transistor of a comparator.
Figure 7B:
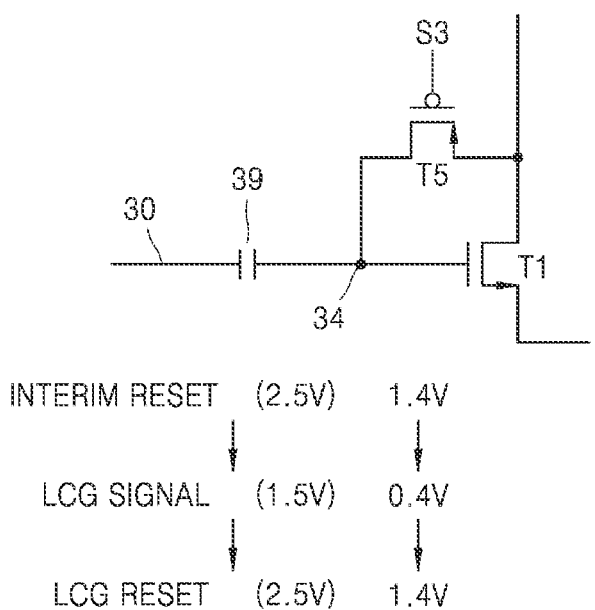

FIGS. 7A and 7B are diagrams showing voltages applied to an input transistor of a comparator. For example, the input transistor may be transistor T1 shown in FIG. 3 or FIG. 4.

In FIGS. 7A and 7B, an LCG signal may be considered as an LCG image or image data used to generate the LCG image.

Referring to FIG. 7B, after the first pixel 40 operates in the HCG mode, the first capacitor 39 may be charged with a voltage difference between the pixel voltage output node 30 and the first input node 34 in the interim reset period P4. For example, 2.5 V (an interim reset voltage) may be applied to the pixel voltage output node 30, as described above, and 1.4 V may be applied to the first input node 34 according to auto-zero level setting. Accordingly, the voltage difference charged in the first capacitor 39 may be 1.1 V. In the LCG image period P5, the voltage applied to the pixel voltage output node 30 may be decreased by charges accumulated in the first floating diffusion node FD1. For example, the voltage applied to the pixel voltage output node 30 in the LCG image period P5 may be 1.5 V, and the voltage difference (1.1 V) charged in the first capacitor 39 may be maintained, and accordingly, a voltage of 0.4 V may be applied to the first input node 34. When the first floating diffusion node FD1 is reset in the LCG reset period P6, the voltage applied to the pixel voltage output node 30 may increase. For example, the voltage applied to the pixel voltage output node 30 in the LCG reset period P6 may be 2.5 V, and the voltage difference (1.1 V) charged in the first capacitor 39 may be maintained, and accordingly, a voltage of 1.4 V may be applied to the first input node 34. According to an embodiment, the comparator 32 may be driven at a voltage of 1.8 V or less and may prevent a high voltage from being applied to the first input transistor T1, according to the descriptions given above.

Unlike FIG. 7B, FIG. 7A shows the case where application of the reset level of the second floating diffusion node FD2 to the pixel voltage output node 30 is skipped in the interim reset period P4. The auto-zero signal S3 may be applied to the comparator 32 such that the first input node 34 is set to the auto-zero level, and because of charges accumulated in the first floating diffusion node FD1, a voltage lower than the reset level of the first floating diffusion node FD1 may be applied to the pixel voltage output node 30. For example, the voltage applied to the first input node 34 may be 1.4 V like the example described above, and the voltage applied to the pixel voltage output node 30 may be 1.5 V (which is lower than the reset level of the first floating diffusion node FD1 because of the accumulated charges) like the example described above. Accordingly, the first capacitor 39 may be charged to 0.1 V that is a voltage difference between the pixel voltage output node 30 and the first input node 34. Thereafter, when the first floating diffusion node FD1 is reset to compare the reset signal of the first pixel 40 in the LCG mode with the ramp signal RAMP, the voltage applied to the pixel voltage output node 30 may increase, and a high voltage may be applied to the first input transistor T1 of the comparator 32, thereby causing a reliability issue. For example, 2.5 V may be applied to the pixel voltage output node 30 like the example described above, and because 0.1 V has been charged in the first capacitor 39, 2.4 V may be applied to the first input node 34. Accordingly, a voltage higher than the drive voltage (1.8 V) of the comparator 32 is applied to the first input transistor T1, which may cause a reliability issue.

Figure 8:
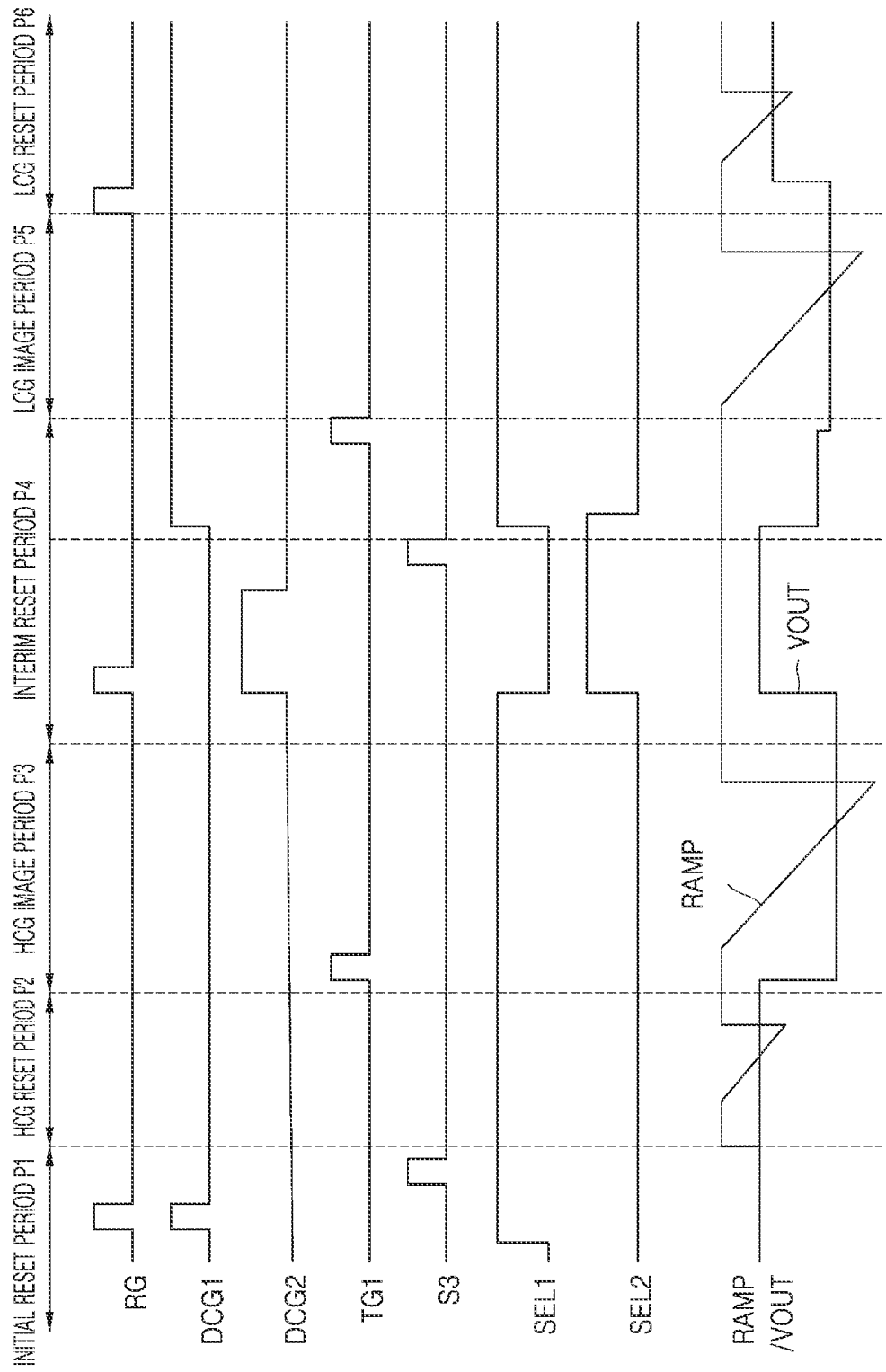
FIG. 8 is a timing diagram illustrating the operations of an image sensor, according to an embodiment.

When the auto-zero level is decreased before a reset signal in the LCG mode is read out by adding a diode or a diode connection to the comparator 32 to avoid the reliability issue, the size of the comparator 32 increase due to the addition of the diode. However, according to the inventive concept, because a voltage corresponding to the difference between the reset voltage of the second pixel 50 and the auto-zero level is charged in the first capacitor 39 in the interim reset period P4, as described above, a high voltage may be prevented from being applied to the first input transistor T1 of the comparator 32, without increasing the size of the comparator 32 by adding the diode. FIG. 8 is a timing diagram illustrating the operations of an image sensor, according to an embodiment. FIG. 8 may be described with reference to FIGS. 5 and 6, and redundant descriptions thereof may be omitted.

FIG. 8 illustrates the operations of the first pixel 40, the second pixel 50, and the comparator 32 when the first pixel 40 in FIG. 4 is read out in the HCG mode and the LCG mode. The reset transistor RX of the first pixel 40 may be connected to the second pixel 50 and thus provide the pixel power supply voltage VDD to the second pixel 50. Control signals, e.g., the reset control signal RG, the first gain control signal DCG1, the first transfer control signal TG1, and the first selection control signal SEL1, which are provided to the first pixel 40, and control signals, e.g., the second gain control signal DCG2 and the second selection control signal SEL2, which are provided to the second pixel 50, may be output from the row driver 120. A control signal, e.g., the auto-zero signal S3, may be provided from the timing controller 190 to the comparator 32.

The second pixel 50 in FIG. 4 may include the second gain control transistor CGX2 and operate in the LCG mode and the HCG mode. The timing diagram of FIG. 8 may include the second gain control signal DCG2 applied to the second gain control transistor CGX2 of the second pixel 50. In the interim reset period P4, the reset transistor RX and the second gain control transistor CGX2 may be turned on in response to the reset control signal RG and the second gain control signal DCG2, respectively, and the second floating diffusion node FD2 may be reset to the pixel power supply voltage VDD.

Although not shown in FIG. 8, the second gain control transistor CGX2 may be turned on in response to the second gain control signal DCG2, and the second floating diffusion node FD2 may be reset to the pixel power supply voltage VDD, in the initial reset period P1. In this case, the second floating diffusion node FD2 may not be reset to the pixel power supply voltage VDD in the interim reset period P4. For example, the second floating diffusion node FD2 may be reset to the pixel power supply voltage VDD in the initial reset period P1 and/or the interim reset period P4, and accordingly, the reset voltage of the second floating diffusion node FD2 may be applied to the pixel voltage output node 30 in the interim reset period P4.

Figure 9:
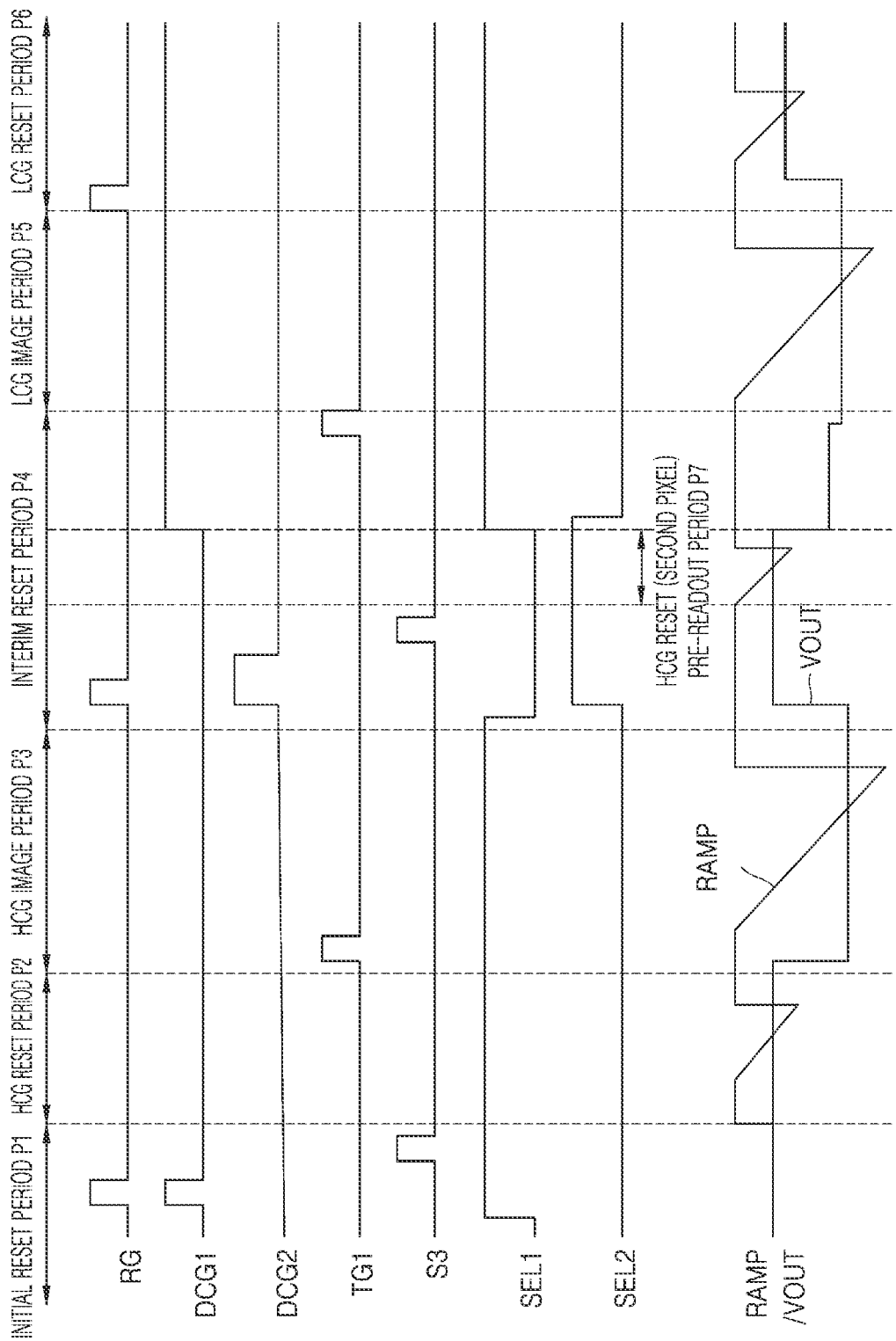
FIGS. 9 and 10 are timing diagrams illustrating the operations of an image sensor, according to an embodiment.
Figure 10:
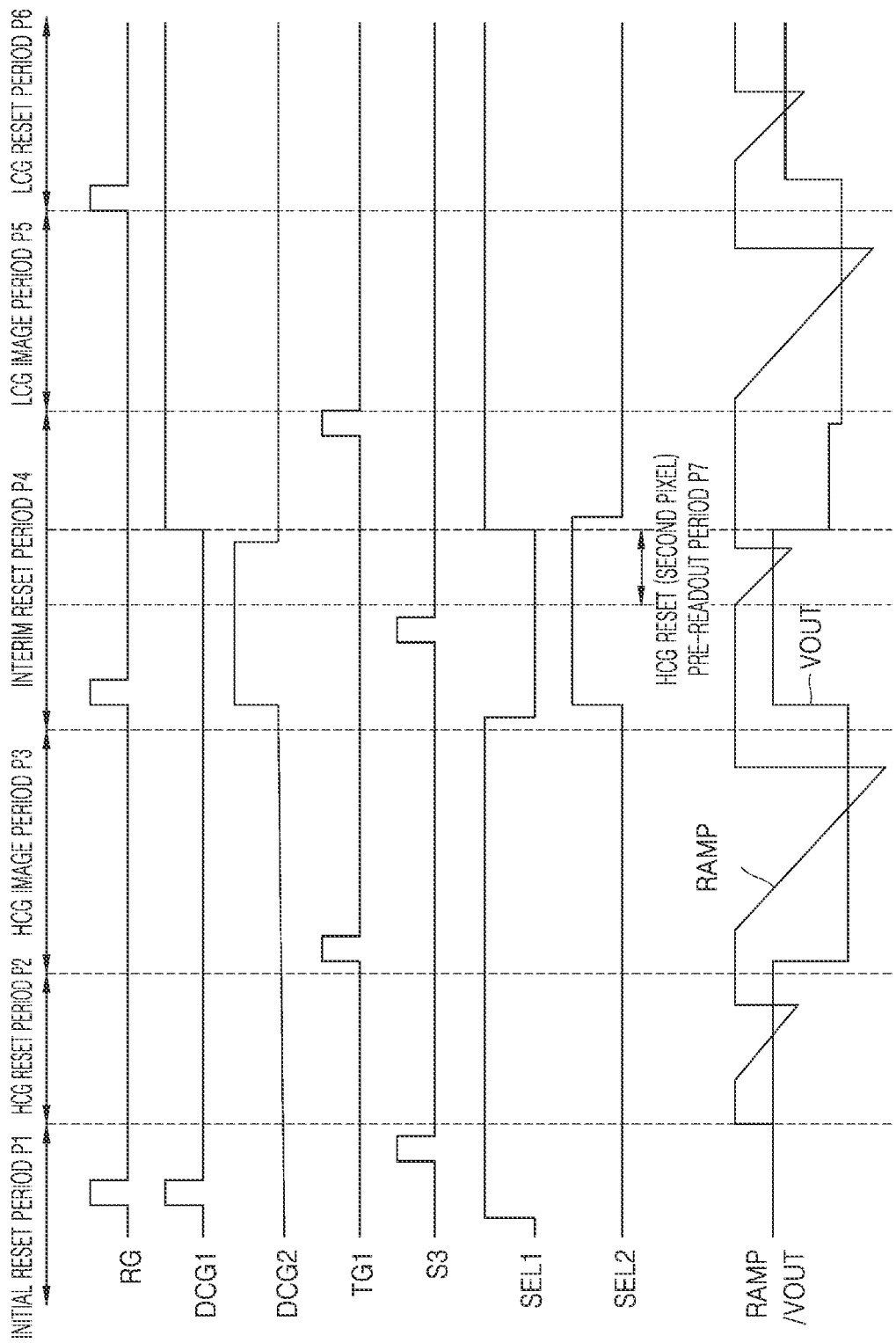

FIGS. 9 and 10 are timing diagrams illustrating the operations of an image sensor, according to an embodiment. FIGS. 9 and 10 may be described with reference to FIG. 8, and redundant descriptions given above with reference to FIGS. 5 and 6 may be omitted.

Referring to FIGS. 9 and 10, the interim reset period P4 may include a pre-readout period P7. In the pre-readout period P7, the comparator 32 may compare the ramp signal RAMP with a second reset signal based on the reset voltage of the second floating diffusion node FD2 of the second pixel 50 to generate a comparison signal and output the comparison signal based on the second reset signal.

In the pre-readout period P7, the second gain control signal DCG2 is logic low in FIG. 9 and logic high in FIG. 10. For example, when the second gain control signal DCG2 is logic high, the comparator 32 may compare a second LCG reset signal with the ramp signal RAMP to generate the comparison signal and output a comparison signal based on the second LCG reset signal. When the second gain control signal DCG2 is logic low, the comparator 32 may compare a second HCG reset signal with the ramp signal RAMP and output a comparison signal based on the second HCG reset signal.

In the pre-readout period P7 during the readout period of the first pixel 40, a comparison signal, which is output from the comparator 32 based on the second LCG reset signal or the second HCG reset signal, may be used to read out the second pixel 50. For example, a comparison signal, which is generated based on the second LCG reset signal or the second HCG reset signal during the readout of the first pixel 40, may be used when the second pixel 50 is read out in the LCG mode or the HCG mode, and a process, in which the comparator 32 compares the second LCG reset signal or the second HCG reset signal with the ramp signal RAMP in the LCG or HCG mode of the second pixel 50, may be skipped. When the comparison signal is used, the reset control signal RG may be activated only twice during the readout period (P1 to P6) unlike FIG. 8. Memory may be needed to use the comparison signal, which is generated based on the second LCG reset signal or the second HCG reset signal during the readout of the first pixel 40, to read out the second pixel 50. The memory may be provided inside or outside a pixel in the image sensor 100 and may include volatile memory but is not limited thereto.

Although not shown in FIGS. 8 to 10, the second gain control signal DCG2 may be activated simultaneously with the first gain control signal DCG1 in the initial reset period P1 such that the second floating diffusion node FD2 may be reset to the pixel power supply voltage VDD simultaneously with the first floating diffusion node FD1. However, embodiments are not limited thereto. For example, the first and second floating diffusion nodes FD1 and FD2 may be reset to the pixel power supply voltage VDD in the initial reset period P1 but not necessarily simultaneously. The second floating diffusion node FD2 may be reset after the first floating diffusion node FD1 is reset while the reset transistor RX is being turned on, or the first floating diffusion node FD1 may be reset after the second floating diffusion node FD2 is reset. When the first and second floating diffusion nodes FD1 and FD2 are reset to the pixel power supply voltage VDD in the initial reset period P1, the reset control signal RG may not be activated in the interim reset period P4.

Although not shown in FIGS. 9 and 10, as described above with reference to FIG. 6, when the first transfer control signal TG1 is activated such that charges accumulated in the first photodiode PD1 transfer to the first floating diffusion node FD1 in the HCG image period P3 and the first floating diffusion node FD1 saturates with the charges, the first transfer control signal TG1 may not be activated in the interim reset period P4.

Figure 11:
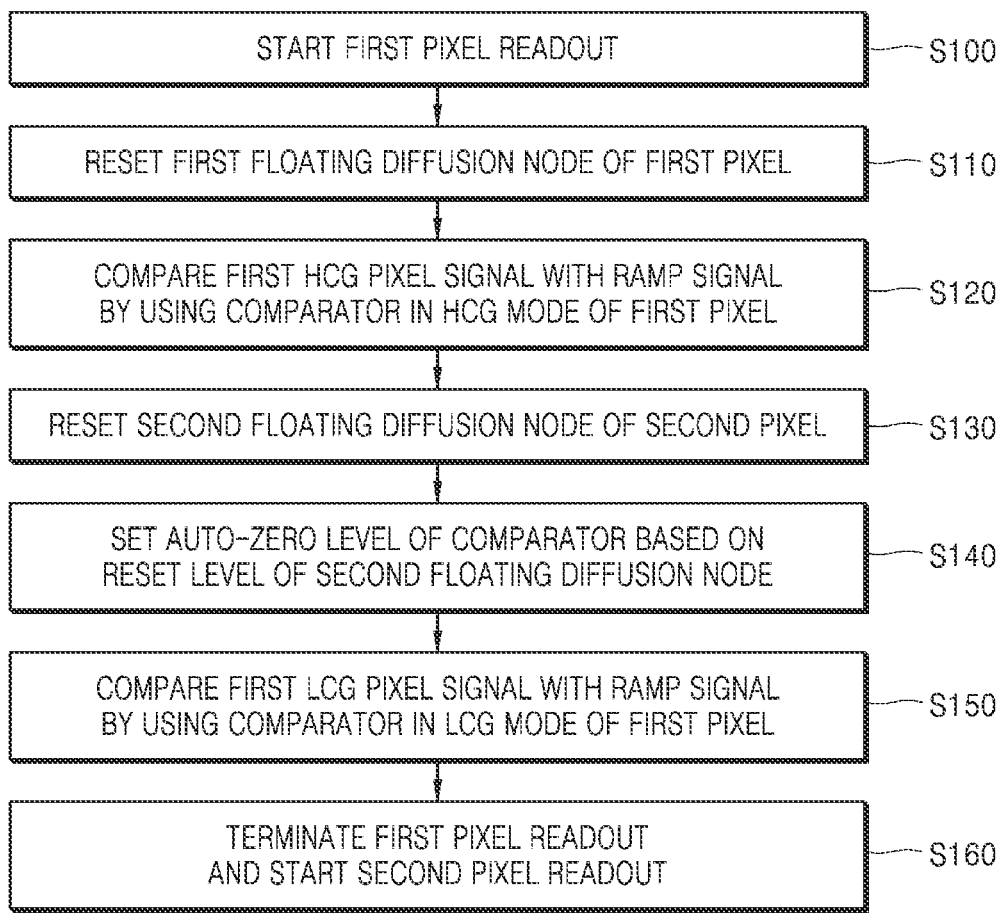
FIG. 11 is a flowchart of an operating method of an image sensor, according to an embodiment.

FIG. 11 is a flowchart of an operating method of an image sensor, according to an embodiment.

The method of FIG. 11 relates to an operating method of the image sensor 100 including a plurality of pixels, which operate in the LCG mode and the HCG mode, and at least one comparator. The method of FIG. 11 may be understood with reference to FIG. 4.

The readout of the first pixel 40 is started S100. The first floating diffusion node FD1 of the first pixel 40 is reset in operation S110. The reset transistor RX and the first gain control transistor CGX1 may be turned on, and the first floating diffusion node FD1 may be set to the pixel power supply voltage VDD. For example, the first floating diffusion node FD1 may be reset by turning on the reset transistor RX and the first gain control transistor CGX1.

In the HCG mode of the first pixel 40, the comparator 32 compares a first HCG pixel signal with the ramp signal RAMP in operation S120. The first HCG pixel signal may include a first HCG reset signal and a first HCG image signal. The comparator 32 may compare the first HCG reset signal with the ramp signal RAMP and output a comparison signal based on the first HCG reset signal. Also, the comparator 32 may compare the first HCG image signal with the ramp signal RAMP and output a comparison signal based on the first HCG image signal.

The second floating diffusion node FD2 of the second pixel 50 is reset in operation S130. The reset transistor RX and the second gain control transistor CGX2 may be turned on, and the second floating diffusion node FD2 may be set to the pixel power supply voltage VDD. For example, the second floating diffusion node FD2 may be reset by turning on the reset transistor RX and the second gain control transistor CGX2.

An auto-zero level of the comparator 32 is set based on a reset level of the second floating diffusion node FD2 in operation S140. The second select transistor SX2 may be turned on in response to the second selection control signal SEL2, and a reset voltage of the second floating diffusion node FD2 may be applied to the pixel voltage output node 30. For example, 2.5 V may be applied to the pixel voltage output node 30. The auto-zero signal S3 may be applied to the comparator 32, and the respective voltage levels of the first input node 34, the second input node 35, the comparison node 36, and the output node 37 of the comparator 32 may be the same as one another as an auto-zero level. For example, the auto-zero level may be 1.4 V.

That the auto-zero level of the comparator 32 is set based on the reset level of the second floating diffusion node FD2 may mean that a voltage corresponding to the difference between the auto-zero level and the reset level is charged in the first capacitor 39. This may also be applied to the descriptions of FIGS. 12 to 14 below.

In the LCG mode of the first pixel 40, the comparator 32 compares a first LCG pixel signal with the ramp signal RAMP in operation S150. The first LCG pixel signal may include a first LCG reset signal and a first LCG image signal. The comparator 32 may compare the first LCG reset signal with the ramp signal RAMP and output a comparison signal based on the first LCG reset signal. Also, the comparator 32 may compare the first LCG image signal with the ramp signal RAMP and output a comparison signal based on the first LCG image signal.

An operation of an image sensor according to the embodiment of FIG. 11 may be performed in a single frame or in a single frame period.

Figure 12:
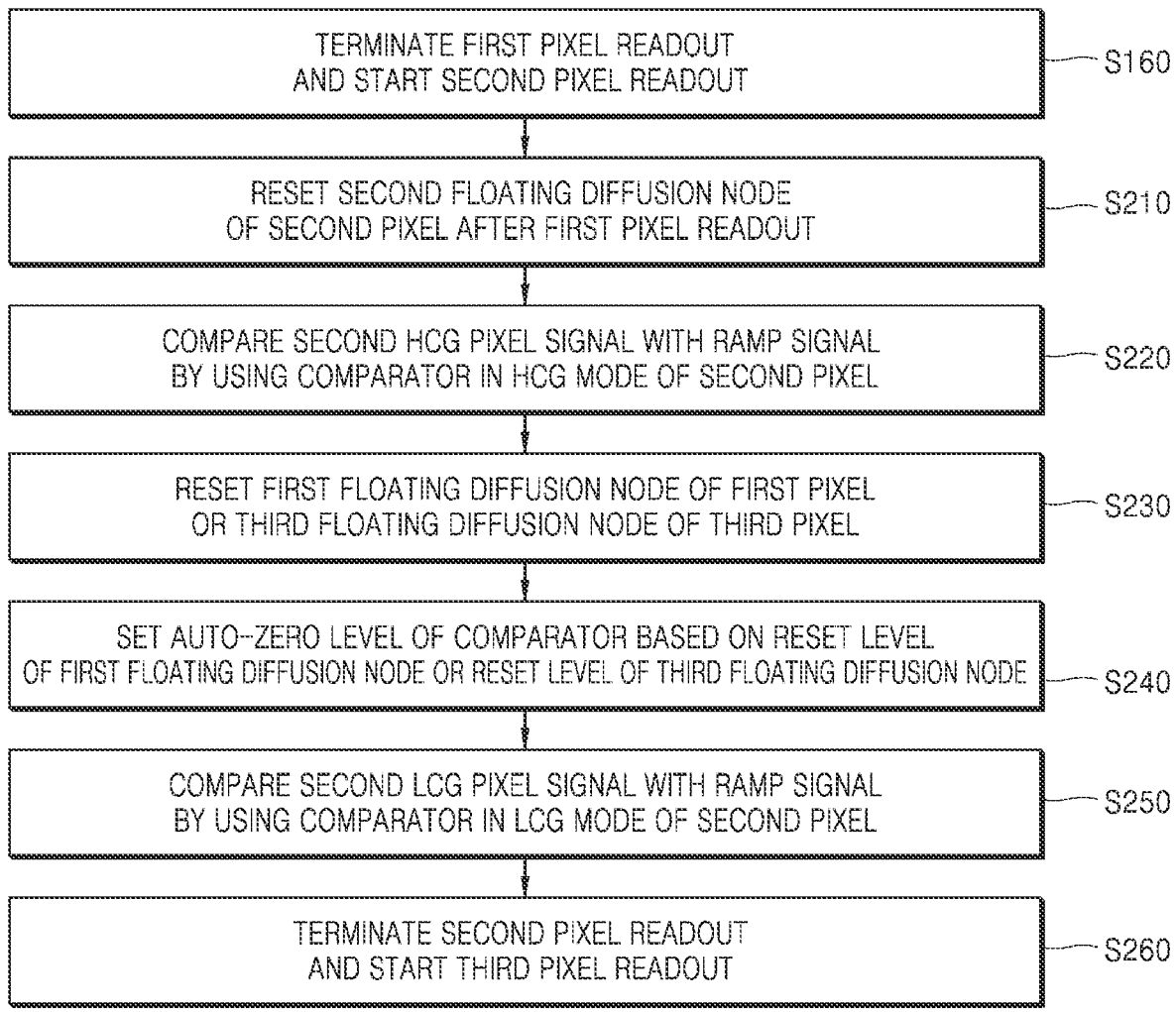
FIG. 12 is a flowchart of an operating method of an image sensor reading a second pixel signal of a second pixel after reading a first pixel signal of a first pixel, according to an embodiment.

FIG. 12 is a flowchart of an operating method of an image sensor reading a second pixel signal of a second pixel after reading a first pixel signal of a first pixel, according to an embodiment. FIG. 12 may be described with reference to FIG. 11.

Readout of the first pixel 40 ends, and readout of the second pixel 50 starts in operation S160. For example, after a first pixel signal of the first pixel 40 is read by using the method of FIG. 11, an operation of reading a second pixel signal of the second pixel 50 may start.

After the readout of the first pixel 40, the second floating diffusion node FD2 of the second pixel 50 is reset in operation S210. The reset transistor RX and the second gain control transistor CGX2 may be turned on, and the second floating diffusion node FD2 may be reset to the pixel power supply voltage VDD. For example, the second floating diffusion node FD2 may be reset by turning on reset transistor RX and the second gain control transistor CGX2.

In the HCG mode of the second pixel 50, the comparator 32 compares a second HCG pixel signal with the ramp signal RAMP in operation S220. The second HCG pixel signal may include a second HCG reset signal and a second HCG image signal. The comparator 32 may compare the second HCG reset signal with the ramp signal RAMP and output a comparison signal based on the second HCG reset signal. Also, the comparator 32 may compare the second HCG image signal with the ramp signal RAMP and output a comparison signal based on the second HCG image signal.

The first floating diffusion node FD1 of the first pixel 40 or the third floating diffusion node FD3 of a third pixel is reset in operation S230. The reset transistor RX and the first gain control transistor CGX1 and/or a third gain control transistor CGX3 may be turned on, and the first floating diffusion node FD1 and/or the third floating diffusion node FD3 may be set to the pixel power supply voltage VDD. For example, in the flowchart of FIG. 12, the image sensor may further include the third pixel. The third pixel may have a similar structure to the second pixel 50 in FIG. 4. Although a plurality of transistors below are not represented in the drawings, they may be understood through the description described below. For example, the third pixel may include the third floating diffusion node corresponding to the second floating diffusion node FD2 of the second pixel 50, a third transfer transistor corresponding to the second transfer transistor TX2 of the second pixel 50, the third gain control transistor corresponding to the second gain control transistor CGX2 of the second pixel 50, and a third select transistor corresponding to the second select transistor SX2 of the second pixel 50, and the reset transistor RX may be connected to the third gain control transistor.

An auto-zero level of the comparator 32 is set based on a reset level of the first diffusion node FD1 or the third floating diffusion node in operation S240. The first select transistor SX1 and/or the third select transistor may be turned on in response to the first selection control signal SEL1 and/or a third selection control signal, and a reset voltage of the first floating diffusion node FD1 and/or a reset voltage of the third floating diffusion node may be applied to the pixel voltage output node 30. Although the third selection control signal is not represented in the drawing, it is a signal for controlling the operation of the third selection transistor. For example, 2.5 V may be applied to the pixel voltage output node 30. The auto-zero signal S3 may be applied to the comparator 32, and the respective voltage levels of the first input node 34, the second input node 35, the comparison node 36, and the output node 37 of the comparator 32 may be the same as one another as an auto-zero level. For example, the auto-zero level may be 1.4 V.

In the LCG mode of the second pixel 50, the comparator 32 compares a second LCG pixel signal with the ramp signal RAMP in operation S250. The second LCG pixel signal may include a second LCG reset signal and a second LCG image signal. The comparator 32 may compare the second LCG reset signal with the ramp signal RAMP and output a comparison signal based on the second LCG reset signal. Also, the comparator 32 may compare the second LCG image signal with the ramp signal RAMP and output a comparison signal based on the second LCG image signal.

After the readout of the second pixel 50, readout of the third pixel may start in operation S260. After the second pixel 50 is read out, the third pixel may be read out. The second pixel 50 and the third pixel may be in the same column as each other.

Figure 13:
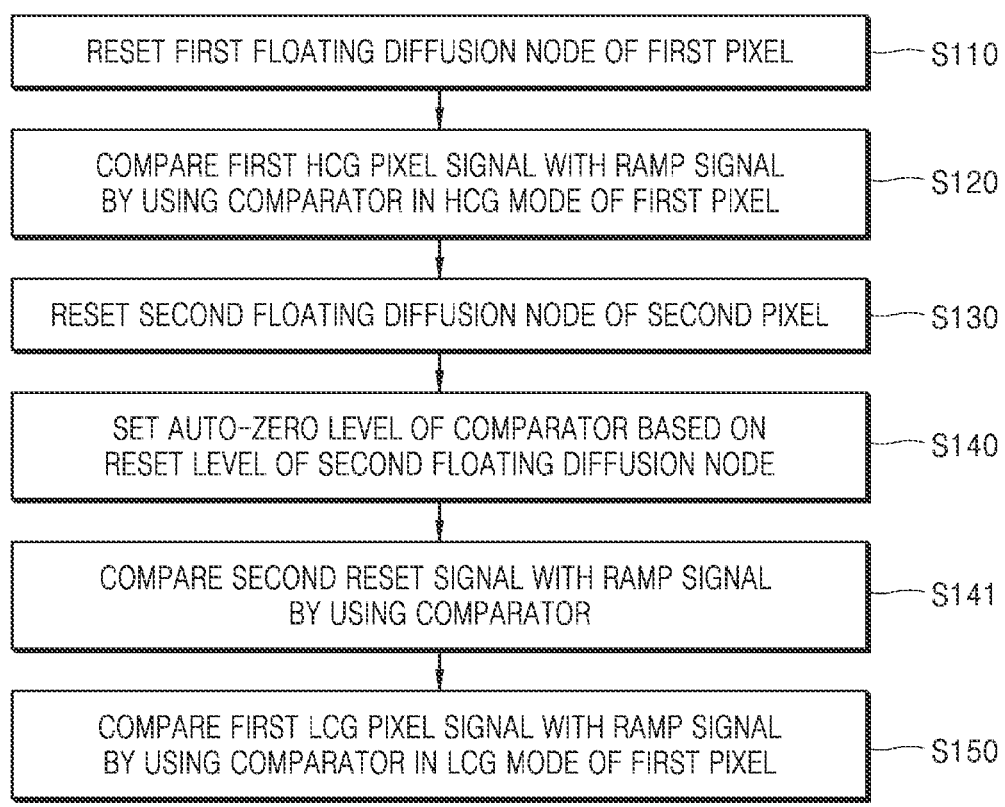
FIG. 13 is a flowchart of an operating method of an image sensor, according to an embodiment.

FIG. 13 is a flowchart of an operating method of an image sensor, according to an embodiment. FIG. 13 may be described with reference to FIG. 11, and redundant descriptions thereof may be omitted.

The comparator 32 included in the image sensor according to the present embodiment compares a second reset signal of the second pixel 50 with the ramp signal RAMP in operation S141. After the auto-zero level of the comparator 32 is set based on the reset level of the second floating diffusion node FD2 in operation S140, the comparator 32 may compare the second reset signal with the ramp signal RAMP. When the comparator 32 compares the second reset signal with the ramp signal RAMP, in the case where the second gain control transistor CGX2 is turned on in response to the second gain control signal DCG2, the comparator 32 may compare the second LCG reset signal with the ramp signal RAMP and output a comparison signal based on the second LCG reset signal. For example, in the case where the second gain control transistor CGX2 is in a turn-off state, the comparator 32 may output a comparison signal based on the second HCG reset signal. The comparison signal based on the second LCG reset signal or the comparison signal based on the second HCG reset signal may be used to read out the second pixel 50.

Figure 14:
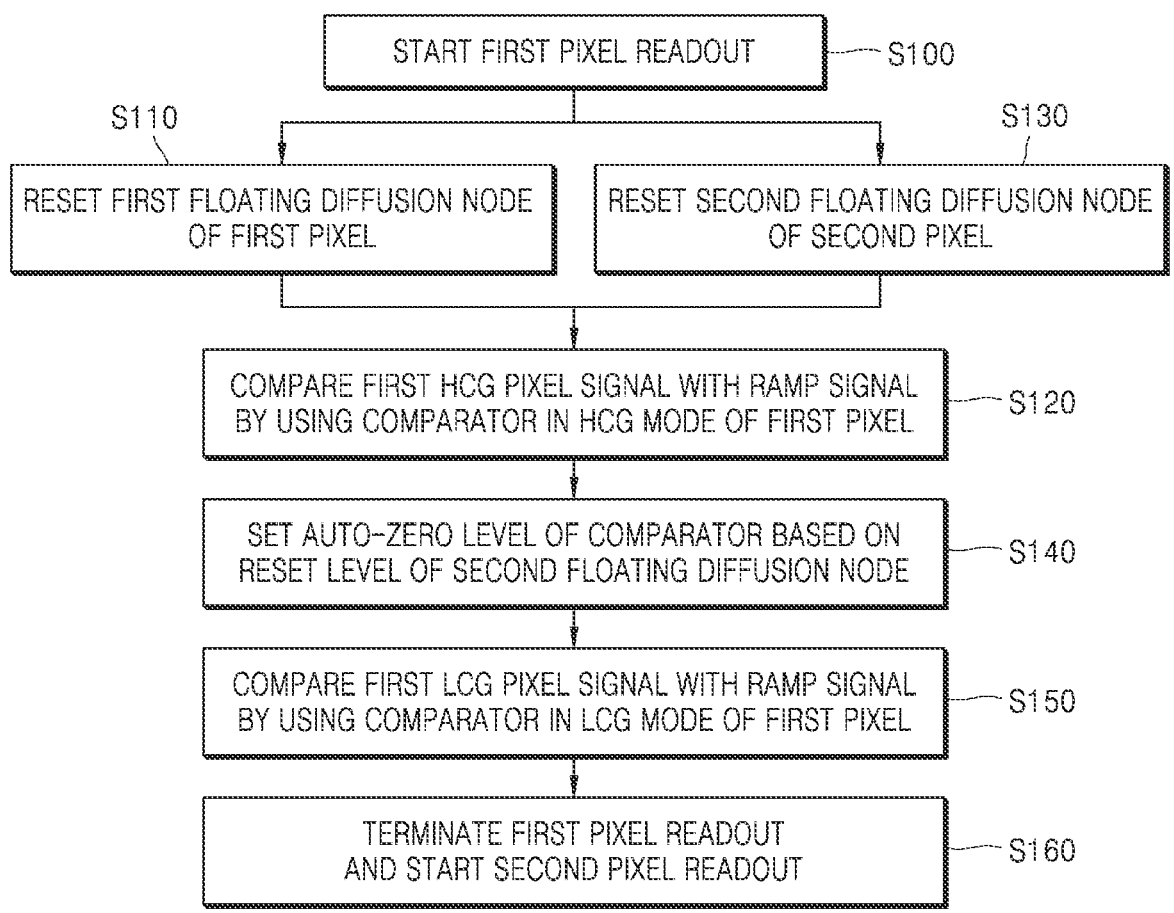
FIG. 14 is a flowchart of an operating method of an image sensor, according to an embodiment.

FIG. 14 is a flowchart of an operating method of an image sensor, according to an embodiment.

According to the present embodiment, the image sensor may reset the first floating diffusion node FD1 of the first pixel 40 in operation S110 and reset the second floating diffusion node FD2 of the second pixel 50 in operation S130 before the comparator 32 of the image sensor compares the first HCG pixel signal with the ramp signal RAMP in the HCG mode of the first pixel 40 in operation S120.

Figure 15:
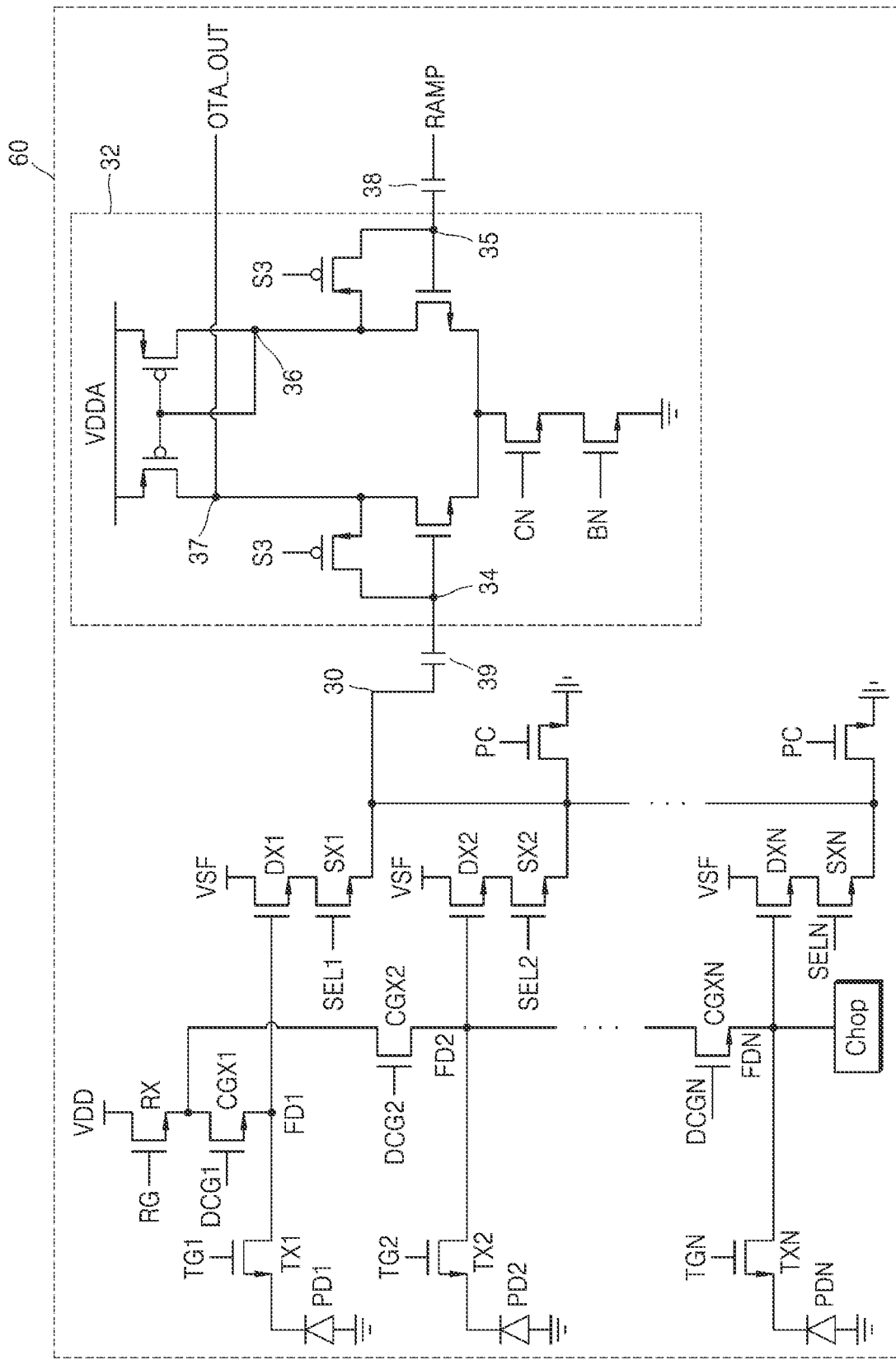
FIG. 15 is a circuit diagram of a pixel, which includes a plurality of photodiodes and a comparator, according to an embodiment.

FIG. 15 is a circuit diagram of a pixel, which includes a plurality of photodiodes and a comparator, according to an embodiment. FIG. 15 may be described with reference to FIG. 3, and redundant descriptions may be omitted.

Referring to FIG. 15, according to an embodiment, a pixel 60 may include a plurality of photodiodes, e.g., first to N-th photodiodes PD1 to PDN, and the comparator 32. Here, N is an integer of at least 2.

The first to N-th photodiodes PD1 to PDN may be respectively connected to a plurality of floating diffusion nodes, e.g., first to N-th floating diffusion nodes FD1 to FDN, when a plurality of transfer transistors, e.g., first to N-th transfer transistors TX1 to TXN, are turned on. The floating diffusion nodes FD1 to FDN may be connected to the reset transistor RX when the first gain control transistor CGX1 and second gain control transistors CGX2 to CGXN are turned on.

Charges may accumulate in the first to N-th photodiodes PD1 to PDN by incident light, the first to N-th transfer transistors TX1 to TXN may be turned on in response to a plurality of transfer control signals, e.g., first to N-th transfer control signals TG1 to TGN, respectively, and the charges accumulated in the first to N-th photodiodes PD1 to PDN may transfer to the first to N-th floating diffusion nodes FD1 to FDN, respectively. For convenience of description, descriptions below are focused on the first photodiode PD1, the first transfer control signal TG1, the first transfer transistor TX1, the first floating diffusion node FD1, and the first gain control transistor CGX1. However, a pixel of the inventive concept is not limited thereto, and the other elements of the pixel may be understood based on the descriptions below.

When the first floating diffusion node FD1 is connected to the reset transistor RX and reset, a first photodiode reset signal may be generated based on the reset level of the first floating diffusion node FD1. When the first transfer transistor TX1 is turned on and charges transfer to the first floating diffusion node FD1, a first photodiode image signal may be generated based on the charges transferred to the first floating diffusion node FD1. A first photodiode signal may include the first photodiode reset signal and the first photodiode image signal.

According to the operation of the first gain control transistor CGX1, a signal based on the charges accumulated in the first photodiode PD1 may be read in the LCG mode or the HCG mode. For example, when the first gain control transistor CGX1 is turned on, the first photodiode signal may be generated in the LCG mode. The first photodiode signal in the LCG mode may be referred to as a first LCG photodiode signal. The first LCG photodiode signal may include a first LCG photodiode reset signal and a first LCG photodiode image signal. Similarly, a first photodiode signal in the HCG mode may be referred to as a first HCG photodiode signal. The first HCG photodiode signal may include a first HCG photodiode reset signal and a first HCG photodiode image signal.

The comparator 32 may compare the first HCG photodiode signal and the first LCG photodiode signal with the ramp signal RAMP and output comparison signals, the reset level of the first floating diffusion node FD1 may be applied to the pixel voltage output node 30 and set as the auto-zero level of the comparator 32. Although it is described that the reset level of the first floating diffusion node FD1 is applied to the pixel voltage output node 30, embodiments are not limited thereto and to descriptions below. The reset level of any one of the other floating diffusion nodes, i.e., the second to N-th floating diffusion nodes FD2 to FDN, than the first floating diffusion node FD1 may be applied to the pixel voltage output node 30.

Before the first HCG photodiode signal is compared with the ramp signal RAMP, both the first and second floating diffusion nodes FD1 and FD2 may be reset to the pixel power supply voltage VDD.

The first HCG photodiode signal may be compared with the ramp signal RAMP, and a second photodiode reset signal may be compared with the ramp signal RAMP. That the second photodiode reset signal is compared with the ramp signal RAMP may mean that a second LCG photodiode reset signal is compared with the ramp signal RAMP when the second gain control transistor CGX2 is turned on and that a second HCG photodiode reset signal is compared with the ramp signal RAMP when the second gain control transistor CGX2 is turned off.

An operation of comparing the first photodiode signal with the ramp signal RAMP and outputting a comparison signal may be performed in the same frame or frame period as an operation of comparing an N-th photodiode signal with the ramp signal RAMP and outputting a comparison signal, but the inventive concept is not limited thereto.

According to an embodiment, the pixel 60 may further include an ADC circuit including the comparator 32. The ADC circuit has been described above, and thus, descriptions thereof are omitted.

Figure 16:
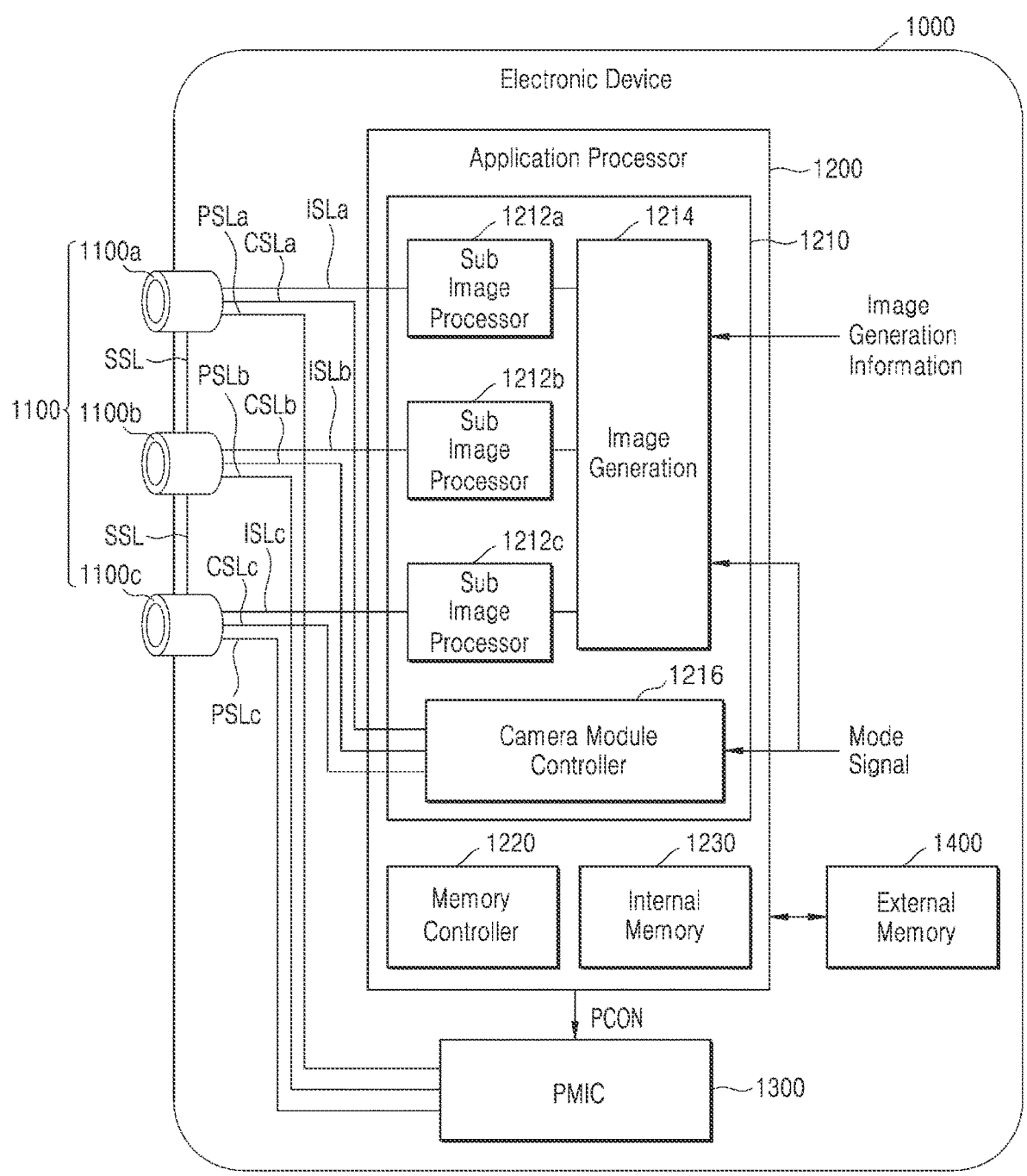
FIG. 16 is a block diagram of an electronic device including a multi-camera module.
Figure 17:
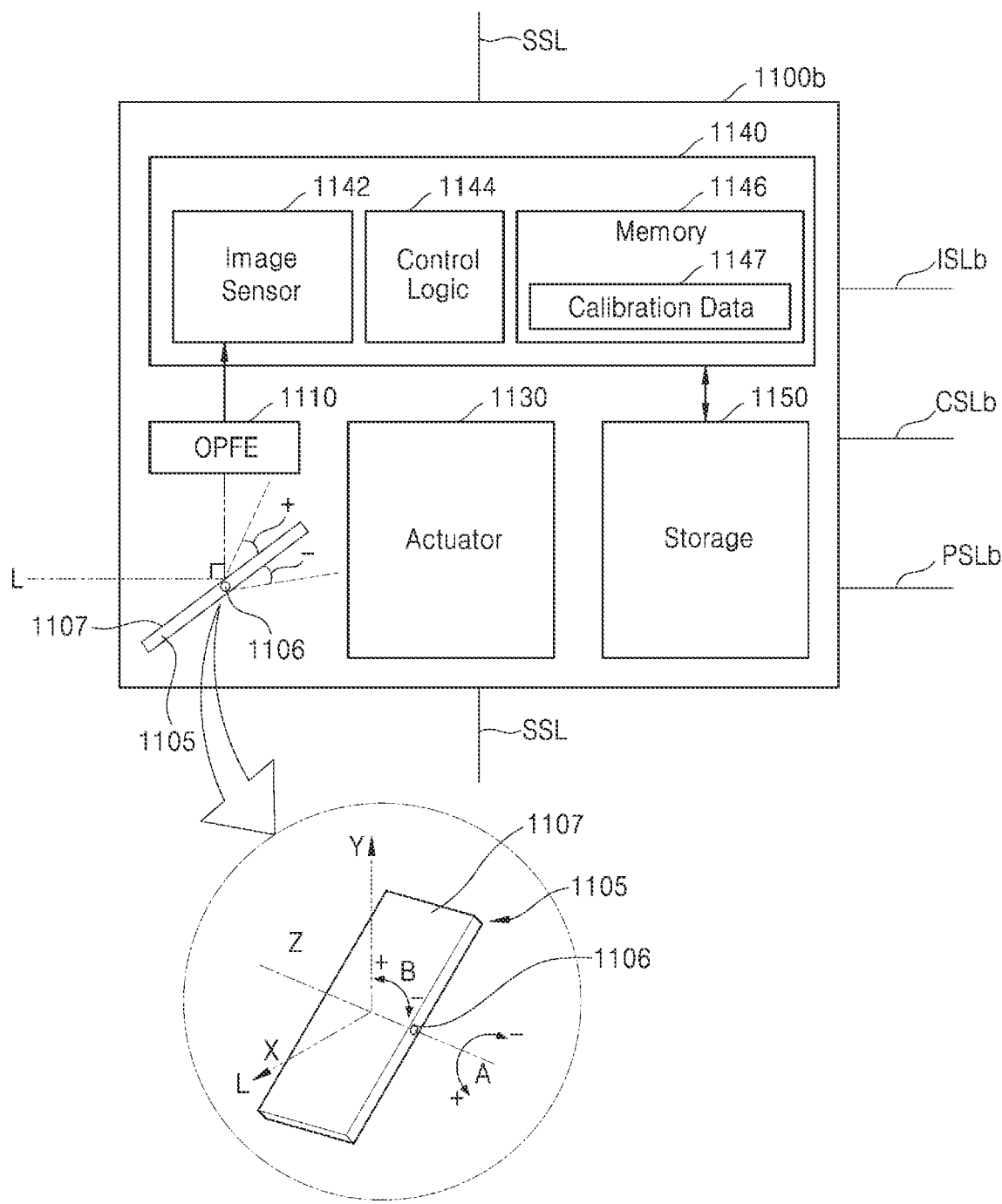
FIG. 17 is a detailed block diagram of a camera module in FIG. 16.

FIG. 16 is a block diagram of an electronic device including a multi-camera module. FIG. 17 is a detailed block diagram of a camera module in FIG. 16.

Referring to FIG. 16, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. Although three camera modules 1100a, 1100b, and 1100c are illustrated in FIG. 16, embodiments are not limited thereto. In some embodiments, the camera module group 1100 may be modified to include only two camera modules. In some embodiments, the camera module group 1100 may be modified to include "k" camera modules, where "k" is a natural number of at least 4. The camera modules 1100a, 1100b, and 1100c may each include one or more of the above-described image sensor 100.

The detailed configuration of the camera module 1100b is described with reference to FIG. 17 below. The descriptions below may also be applied to the other camera modules 1100a and 1100c.

Referring to FIG. 17, the camera module 1100b may include a prism 1105, an optical path folding element (OPFE) 1110, an actuator 1130, an image sensing device 1140, and a storage 1150.

The prism 1105 may include a reflective surface 1107 of a light reflecting material and may change the path of light L incident from outside.

In some embodiments, the prism 1105 may change the path of the light L incident in a first direction X into a second direction Y perpendicular to the first direction X. The prism 1105 may rotate the reflective surface 1107 of the light reflecting material in a direction A around a central shaft 1106 or rotate the central shaft 1106 in a direction B so that the path of the light L incident in the first direction X is changed into the second direction Y perpendicular to the first direction X. At this time, the OPFE 1110 may move in a third direction Z, which is perpendicular to the first and second directions X and Y.

In some embodiments, an A-direction maximum rotation angle of the prism 1105 may be less than or equal to 15 degrees in a plus (+) A direction and greater than 15 degrees in a minus (−) A direction, but embodiments are not limited thereto.

In some embodiments, the prism 1105 may move by an angle of about 20 degrees or in a range from about 10 degrees to about 20 degrees or from about 15 degrees to about 20 degrees in a plus or minus B direction. At this time, an angle by which the prism 1105 moves in the plus B direction may be the same as or similar, within a difference of about 1 degree, to an angle by which the prism 1105 moves in the minus B direction.

In some embodiments, the prism 1105 may move the reflective surface 1107 of the light reflecting material in the third direction Z parallel with an extension direction of the central shaft 1106.

The OPFE 1110 may include, for example, "m" optical lenses, where "m" is a natural number. The "m" lenses may move in the second direction Y and change an optical zoom ratio of the camera module 1100b. For example, when the default optical zoom ratio of the camera module 1100b is Z, the optical zoom ratio of the camera module 1100b may be changed to 3Z, 5Z, or greater by moving the "m" optical lenses included in the OPFE 1110.

The actuator 1130 may move the OPFE 1110 (or an optical lens) (hereinafter, referred to as an optical lens) to a certain position. For example, the actuator 1130 may adjust the position of the optical lens such that an image sensor 1142 is at a focal length of the optical lens for accurate sensing.

The image sensing device 1140 may include the image sensor 1142, a control logic 1144, and a memory 1146. The image sensor 1142 may sense an image of an object by using the light L provided through the optical lens. The image sensor 100, the elements, e.g., the pixel 20 (of FIG. 2) supporting dual conversion gain, of the image sensor 100, and a readout method of the pixel 20 (e.g., a method of preventing a high voltage from being applied to an input transistor of the comparator 32), which have been described above with reference to FIGS. 1 to 13, may be applied to the image sensor 1142. The image sensor 1142 may generate image data having a high dynamic range by merging HCG image data and LCG image data.

The control logic 1144 may generally control operations of the camera module 1100b. For example, the control logic 1144 may control operation of the camera module 1100b, according to a control signal provided through a control signal line CSLb.

The memory 1146 may store information, such as calibration data 1147, necessary for the operation of the camera module 1100b. The calibration data 1147 may include information, which is necessary for the camera module 1100b to generate image data using the light L provided from outside. For example, the calibration data 1147 may include information about the degree of rotation described above, information about a focal length, information about an optical axis, or the like. When the camera module 1100b is implemented as a multi-state camera that has a focal length varying with the position of the optical lens, the calibration data 1147 may include a value of a focal length for each position (or state) of the optical lens and information about auto focusing.

The storage 1150 may store image data sensed by the image sensor 1142. The storage 1150 may be provided outside the image sensing device 1140 and may form a stack with a sensor chip of the image sensing device 1140. In some embodiments, the storage 1150 may include electrically erasable programmable read-only memory (EEPROM), but embodiments are not limited thereto.

Referring to FIGS. 16 and 17, in some embodiments, each of the camera modules 1100a, 1100b, and 1100c may include the actuator 1130. Accordingly, the camera modules 1100a, 1100b, and 1100c may include the calibration data 1147, which is the same or different among the camera modules 1100a, 1100b, and 1100c according to the operation of the actuator 1130 included in each of the camera modules 1100a, 1100b, and 1100c.

In some embodiments, one (e.g., the camera module 1100b) of the camera modules 1100a, 1100b, and 1100c may be of a folded-lens type including the prism 1105 and the OPFE 1110 while the other camera modules (e.g., the camera modules 1100a and 1100c) may be of a vertical type that does not include the prism 1105 and the OPFE 1110. However, embodiments are not limited thereto.

In some embodiments, one (e.g., the camera module 1100c) of the camera modules 1100a, 1100b, and 1100c may include a vertical depth camera, which extracts depth information using an infrared ray (IR). In this case, the application processor 1200 may generate a three-dimensional (3D) depth image by merging image data provided from the depth camera with image data provided from another camera module (e.g., the camera module 1100a or 1100b).

In some embodiments, at least two camera modules (e.g., 1100a and 1100b) among the camera modules 1100a, 1100b, and 1100c may have different field-of-views. In this case, the two camera modules (e.g., 1100a and 1100b) among the camera modules 1100a, 1100b, and 1100c may respectively have different optical lenses, but embodiments are not limited thereto.

In some embodiments, the camera modules 1100a, 1100b, and 1100c may have different field-of-views from one another. In this case, the camera modules 1100a, 1100b, and 1100c may respectively have different optical lenses, but embodiments are not limited thereto.

In some embodiments, the camera modules 1100a, 1100b, and 1100c may be physically separated from one another. In other words, the sensing area of the image sensor 1142 is not divided and used by the camera modules 1100a, 1100b, and 1100c, but the image sensor 1142 may be independently included in each of the camera modules 1100a, 1100b, and 1100c.

Referring back to FIG. 16, the application processor 1200 may include an image processing unit 1210, a memory controller 1220, and an internal memory 1230. The application processor 1200 may be separately implemented from the camera modules 1100a, 1100b, and 1100c. For example, the application processor 1200 may be implemented in a different semiconductor chip than the camera modules 1100a, 1100b, and 1100c.

The image processing unit 1210 may include a plurality of sub image processors 1212a, 1212b, and 1212c, an image generator 1214, and a camera module controller 1216.

The image processing unit 1210 may include as many sub image processors 1212a, 1212b, and 1212c as the camera modules 1100a, 1100b, and 1100c.

Pieces of image data respectively generated from the camera modules 1100a, 1100b, and 1100c may be respectively provided to the sub image processors 1212a, 1212b, and 1212c respectively through image signal lines ISLa, ISLb, and ISLc, which are separated from one another. For example, image data generated from the camera module 1100a may be provided to the sub image processor 1212a through the image signal line ISLa, image data generated from the camera module 1100b may be provided to the sub image processor 1212b through the image signal line ISLb, and image data generated from the camera module 1100c may be provided to the sub image processor 1212c through the image signal line ISLc. Such image data transmission may be performed using, for example, a mobile industry processor interface (MIPI)-based camera serial interface (CSI), but embodiments are not limited thereto.

In some embodiments, a single sub image processor may be provided for a plurality of camera modules. For example, differently from FIG. 16, the sub image processors 1212a and 1212c may not be separate from each other but may be integrated into a single sub image processor, and the image data provided from the camera module 1100a or the camera module 1100c may be selected by a selection element (e.g., a multiplexer) and then provided to the integrated sub image processor.

The image data provided to each of the sub image processors 1212a, 1212b, and 1212c may be provided to the image generator 1214. The image generator 1214 may generate an output image using the image data provided from each of the sub image processors 1212a, 1212b, and 1212c according to image generation information or a mode signal.

In detail, the image generator 1214 may generate the output image by merging at least portions of respective pieces of image data, which are respectively generated from the camera modules 1100a, 1100b, and 1100c having different field-of-views, according to the image generation information or the mode signal. Alternatively, the image generator 1214 may generate the output image by selecting one of pieces of image data, which are respectively generated from the camera modules 1100a, 1100b, and 1100c having different field-of-views, according to the image generation information or the mode signal.

In some embodiments, the image generation information may include a zoom signal or a zoom factor. In some embodiments, the mode signal may be based on a mode selected by a user.

When the image generation information includes a zoom signal or a zoom factor and the camera modules 1100a, 1100b, and 1100c have different field-of-views, the image generator 1214 may perform different operations according to different kinds of zoom signals. For example, when the zoom signal is a first signal, the image generator 1214 may merge image data output from the camera module 1100a and image data output from the camera module 1100c into a merged image signal and generate an output image using the merged image data and image data, which is output from the camera module 1100b and is not used in the merging. When the zoom signal is a second signal different from the first signal, the image generator 1214 may generate an output image by selecting one of the pieces of image data respectively output from the camera modules 1100a, 1100b, and 1100c, instead of performing the merging. However, embodiments are not limited thereto, and a method of processing image data may be changed whenever necessary.

In some embodiments, the image generator 1214 may receive a plurality of pieces of image data, which have different exposure times, from at least one of the sub image processors 1212a, 1212b, and 1212c and perform high dynamic range (HDR) processing on the pieces of image data, thereby generating merged image data having an increased dynamic range.

The camera module controller 1216 may provide a control signal to each of the camera modules 1100a, 1100b, and 1100c. A control signal generated by the camera module controller 1216 may be provided to its corresponding one of the camera modules 1100a, 1100b, and 1100c through its corresponding one of control signal lines CSLa, CSLb, and CSLc, which are separate from one another.

One (e.g., the camera module 1100b) of the camera modules 1100a, 1100b, and 1100c may be designated as a master camera according to the mode signal or the image generation signal including a zoom signal, and the other camera modules (e.g., 1100a and 1100c) may be designated as slave cameras. Such designation information may be included in a control signal and provided to each of the camera modules 1100a, 1100b, and 1100c through its corresponding one of control signal lines CSLa, CSLb, and CSLc, which are separate from one another.

A camera module operating as a master or a slave may be changed according to a zoom factor or an operation mode signal. For example, when the field-of-view of the camera module 1100a is greater than that of the camera module 1100b and the zoom factor indicates a low zoom ratio, the camera module 1100b may operate as a master and the camera module 1100a may operate as a slave. Contrarily, when the zoom factor indicates a high zoom ratio, the camera module 1100a may operate as a master and the camera module 1100b may operate as a slave.

In some embodiments, a control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit the sync enable signal to the camera module 1100b. The camera module 1100b provided with the sync enable signal may generate a sync signal based on the sync enable signal and may provide the sync signal to the camera modules 1100a and 1100c through a sync signal line SSL. The camera modules 1100a, 1100b, and 1100c may be synchronized with the sync signal and may transmit image data to the application processor 1200.

In some embodiments, a control signal provided from the camera module controller 1216 to each of the camera modules 1100a, 1100b, and 1100c may include mode information according to the mode signal. The camera modules 1100a, 1100b, and 1100c may operate in a first operation mode or a second operation mode in relation with a sensing speed, based on the mode information.

In the first operation mode, the camera modules 1100a, 1100b, and 1100c may generate an image signal at a first speed (e.g., at a first frame rate), encode the image signal at a second speed higher than the first speed (e.g., at a second frame rate higher than the first frame rate), and transmit an encoded image signal to the application processor 1200. At this time, the second speed may be at most 30 times the first speed.

The application processor 1200 may store the received image signal, i.e., the encoded image signal, in the internal memory 1230 therein or the external memory 1400 outside the application processor 1200. Thereafter, the application processor 1200 may read the encoded image signal from the internal memory 1230 or the external memory 1400, decode the encoded image signal, and display image data generated based on a decoded image signal. For example, a corresponding one of the sub image processors 1212a, 1212b, and 1212c of the image processing unit 1210 may perform the decoding and may also perform image processing on the decoded image signal.

In the second operation mode, the camera modules 1100a, 1100b, and 1100c may generate an image signal at a third speed lower than the first speed (e.g., at a third frame rate lower than the first frame rate) and transmit the image signal to the application processor 1200. The image signal provided to the application processor 1200 may not have been encoded. The application processor 1200 may perform image processing on the image signal or store the image signal in the internal memory 1230 or the external memory 1400.

The PMIC 1300 may provide power, e.g., a power supply voltage, to each of the camera modules 1100a, 1100b, and 1100c. For example, under control by the application processor 1200, the PMIC 1300 may provide first power to the camera module 1100a through a power signal line PSLa, second power to the camera module 1100b through a power signal line PSLb, and third power to the camera module 1100c through a power signal line PSLc.

The PMIC 1300 may generate power corresponding to each of the camera modules 1100a, 1100b, and 1100c and adjust the level of the power, in response to a power control signal PCON from the application processor 1200. The power control signal PCON may include a power adjustment signal for each operation mode of the camera modules 1100a, 1100b, and 1100c. For example, the operation mode may include a low-power mode. At this time, the power control signal PCON may include information about a camera module to operate in the low-power mode and a power level to be set. The same or different levels of power may be respectively provided to the camera modules 1100a, 1100b, and 1100c. The level of power may be dynamically changed.

While the inventive concept has been particularly shown and described with reference to embodiments thereof, it will be understood that various changes in form and details may be made therein without departing from the spirit and scope of the disclosure.

What is claimed is:

1. An image sensor comprising:
    a first pixel configured to operate in a high conversion gain (HCG) mode and a low conversion gain (LCG) mode and output a first pixel signal to a column line, the first pixel including a first transfer transistor, a first floating diffusion node, and a first gain control transistor;
    a second pixel configured to output a second pixel signal to the column line, the second pixel including a second transfer transistor and a second floating diffusion node;
    a ramp signal generator configured to generate a ramp signal having a level changing with a certain slope; and
    a comparator configured to compare each of the first and second pixel signals output through the column line with the ramp signal,
    wherein the first pixel is further configured to operate in the HCG mode to output the first pixel signal as a first HCG pixel signal in a first period and operate in the LCG mode to output the second pixel signal as a first LCG pixel signal in a second period, and a reset level of the second floating diffusion node of the second pixel is provided to the comparator through the column line in an interim reset period between the first period and the second period.

2. The image sensor of claim 1, wherein the comparator comprises:
    a first input transistor;
    a first capacitor including a terminal receiving a pixel signal through the column line and an opposite terminal connected to a gate of the first input transistor;
    a second input transistor;
    a second capacitor including a terminal receiving the ramp signal and an opposite terminal connected to a gate of the second input transistor;
    a first output transistor connected in series to the first input transistor;
    a second output transistor connected in series to the second input transistor;
    a first switch connected between the gate of the first input transistor and a drain of the first output transistor; and
    a second switch connected between the gate of the second input transistor and a drain of the second output transistor,
    wherein the reset level of the second floating diffusion node is applied to the terminal of the first capacitor in the interim reset period, the first and second switches are turned on, and an auto-zero level of the comparator is applied to the gate of the first input transistor.

3. The image sensor of claim 1, wherein the first HCG pixel signal includes a first HCG reset signal and a first HCG image signal, the first LCG pixel signal includes a first LCG image signal and a first LCG reset signal, and
    the comparator is further configured to compare the first HCG image signal with the ramp signal after comparing the first HCG reset signal with the ramp signal in the first period and compare the first LCG reset signal with the ramp signal after comparing the first LCG image signal with the ramp signal in the second period.

4. The image sensor of claim 1, wherein the first transfer transistor is turned on in the interim reset period.

5. The image sensor of claim 1, wherein, when the first floating diffusion node saturates in the first period, the first transfer transistor is turned off in the interim reset period.

6. The image sensor of claim 3, wherein the second pixel is further configured to operate in the HCG mode and the LCG mode and includes a second gain control transistor.

7. The image sensor of claim 6, wherein the comparator is further configured to compare the second pixel signal of the second pixel with the ramp signal in a pre-readout period, and the pre-readout period is included in the interim reset period.

8. The image sensor of claim 7, wherein the comparator is further configured to skip comparing of a second HCG reset signal with the ramp signal when comparing the second pixel signal with the ramp signal, when the second gain control transistor is turned off in the pre-readout period.

9. The image sensor of claim 7, wherein the comparator is further configured to skip comparing of a second LCG reset signal with the ramp signal when comparing the second pixel signal with the ramp signal, when the second gain control transistor is turned on in the pre-readout period.

10. An operating method of an image sensor including a plurality of pixels operating in a high conversion gain (HCG) mode and a low conversion gain (LCG) mode and at least one comparator, the operating method comprising:
resetting a first floating diffusion node of a first pixel of the pixels;
comparing, by a comparator, a first HCG pixel signal of the first pixel with a ramp signal in the HCG mode of the first pixel;
resetting a second floating diffusion node of a second pixel of the pixels;
setting an auto-zero level of the comparator, based on a reset level of the second floating diffusion node; and
comparing, by the comparator, a first LCG pixel signal of the first pixel with the ramp signal in the LCG mode of the first pixel.

11. The operating method of claim 10, wherein the operating method is performed in one frame period.

12. The operating method of claim 10, wherein the comparing of the first HCG pixel signal with the ramp signal in the HCG mode of the first pixel includes comparing a first HCG image signal of the first pixel with the ramp signal after comparing a first HCG reset signal of the first pixel with the ramp signal in the HCG mode, and
the comparing of the first LCG pixel signal with the ramp signal in the LCG mode of the first pixel includes comparing a first LCG reset signal of the first pixel with the ramp signal after comparing a first LCG image signal of the first pixel with the ramp signal in the LCG mode.

13. The operating method of claim 10, further comprising:
resetting the second floating diffusion node of the second pixel after reading out the first pixel;
comparing, by the comparator, a pixel signal of the second pixel with the ramp signal in the HCG mode of the second pixel;
resetting one of the first floating diffusion node of the first pixel and a third floating diffusion node of a third pixel;
setting the auto-zero level of the comparator, based on a reset level of one of the first and third floating diffusion nodes; and
comparing, by the at least one comparator, the pixel signal of the second pixel with the ramp signal in the LCG mode of the second pixel.

14. The operating method of claim 10, further comprising comparing, by the at least one comparator, a reset signal of the second pixel with the ramp signal.

15. The operating method of claim 10, wherein the resetting of the first floating diffusion node of the first pixel and the resetting of the second floating diffusion node of the second pixel are performed before the comparing of the first HCG pixel signal with the ramp signal in the HCG mode of the first pixel.

16. The operating method of claim 10, wherein the setting of the auto-zero level of the comparator based on the reset level of the second floating diffusion node includes
turning on a first transfer transistor of the first pixel.

17. A pixel comprising:
a first photodiode;
a second photodiode;
a first transfer transistor;
a second transfer transistor;
a first gain control transistor;
a second gain control transistor;
a first select transistor;
a second select transistor;
a first floating diffusion node;
a second floating diffusion node;
a reset transistor; and
a comparator configured to compare a first photodiode signal generated based on charges accumulated in the first photodiode with a ramp signal and compare a second photodiode signal generated based on charges accumulated in the second photodiode with the ramp signal, compare a first high conversion gain (HCG) photodiode signal with the ramp signal in a first period, and compare a first low conversion gain (LCG) photodiode signal with the ramp signal in a second period, and
wherein a reset level of the second floating diffusion node is provided to the comparator between the first period and the second period.

18. The pixel of claim 17, wherein the second floating diffusion node is reset before the first period.

19. The pixel of claim 17, wherein the comparator is further configured to compare a reset signal of the second floating diffusion node with the ramp signal between the first period and the second period.

20. The pixel of claim 17, further comprising a third floating diffusion node,
wherein, when the comparator compares the second photodiode signal with the ramp signal, a reset level of one of the first and third floating diffusion nodes is provided to the comparator.

* * * * *